(12) United States Patent
Takeda et al.

(10) Patent No.: US 9,638,050 B2
(45) Date of Patent: May 2, 2017

(54) AXIAL COMPRESSOR, GAS TURBINE WITH AXIAL COMPRESSOR, AND ITS REMODELING METHOD

(71) Applicant: Mitsubishi Hitachi Power Systems, Ltd., Yokohama, Kanagawa (JP)

(72) Inventors: Hiroki Takeda, Yokohama (JP); Yasuo Takahashi, Yokohama (JP); Chihiro Myoren, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 332 days.

(21) Appl. No.: 14/444,404

(22) Filed: Jul. 28, 2014

(65) Prior Publication Data
US 2015/0027131 A1    Jan. 29, 2015

(30) Foreign Application Priority Data
Jul. 29, 2013 (JP) .................... 2013-156261

(51) Int. Cl.
*F01D 9/04* (2006.01)
*B23P 6/00* (2006.01)
(Continued)

(52) U.S. Cl.
CPC ............. *F01D 9/042* (2013.01); *B23P 6/00* (2013.01); *F01D 5/146* (2013.01); *F04D 29/542* (2013.01);
(Continued)

(58) Field of Classification Search
CPC . F01D 9/042; F01D 5/146; B23P 6/00; F04D 29/542; F04D 29/644; F05D 2220/3216
(Continued)

(56) References Cited

U.S. PATENT DOCUMENTS 3,742,706 A * 7/1973 Klompas ................. F01D 5/087
                                                      415/115
6,099,249 A    8/2000 Hashimoto
(Continued)

FOREIGN PATENT DOCUMENTS

JP    10-54301 A    2/1998
JP    2004-27926 A    1/2004
(Continued)

OTHER PUBLICATIONS

Extended European Search Report dated Dec. 2, 2014 (seven (7) pages).

*Primary Examiner* — Steven A. Reynolds
(74) *Attorney, Agent, or Firm* — Crowell & Moring LLP

(57) ABSTRACT

An axial compressor includes: a rotor as a rotational shaft, rotor blades mounted on the rotor, a compressor casing that covers the rotor and the rotor blades, and stator vanes mounted on the compressor casing. The rotor blades and the stator vanes are each disposed in a circumferential direction of the rotational shaft to form a rotor-blade cascade and a stator-vane cascade, respectively. The rotor-blade cascade and the stator-vane cascade are arranged in plural rows, respectively, in an axial direction of the rotational shaft. The stator vane has a dovetail, and the compressor casing has a dovetail groove that extends in the circumferential direction of the rotational shaft to receive the dovetail inserted therein to fix the stator vanes. Two or more stator vanes, the stator vanes belonging to stator-vane cascades different from each other, are fixed in the dovetail groove.

14 Claims, 22 Drawing Sheets

(51) Int. Cl.
  *F01D 5/14* (2006.01)
  *F04D 29/54* (2006.01)
  *F04D 29/64* (2006.01)
(52) U.S. Cl.
  CPC .... *F04D 29/644* (2013.01); *F05D 2220/3216* (2013.01); *Y02T 50/673* (2013.01); *Y10T 29/49238* (2015.01)
(58) Field of Classification Search
  USPC .... 60/805, 722; 415/209.4, 209.3, 139, 135; 29/888.021
  See application file for complete search history.

(56) References Cited

U.S. PATENT DOCUMENTS

| | | | |
|---|---|---|---|
| 7,278,821 | B1 | 10/2007 | O'Reilly et al. |
| 7,445,426 | B1 | 11/2008 | Matheny et al. |
| 2004/0060296 | A1 | 4/2004 | Koganezawa et al. |
| 2007/0231122 | A1 | 10/2007 | Tsuru et al. |
| 2011/0158814 | A1 | 6/2011 | Metri et al. |
| 2011/0304893 | A1 | 12/2011 | Sakai |
| 2012/0045312 | A1 | 2/2012 | Kimmel et al. |
| 2013/0104524 | A1* | 5/2013 | Kupratis ............ F02K 3/04 60/226.1 |
| 2014/0069101 | A1* | 3/2014 | Race ............ F04D 29/522 60/726 |
| 2014/0245752 | A1* | 9/2014 | Kurapati ............ F01D 5/14 60/805 |
| 2016/0010475 | A1* | 1/2016 | Alvanos ............ F04D 29/164 60/805 |

FOREIGN PATENT DOCUMENTS

| | | |
|---|---|---|
| JP | 2005-315076 A | 11/2005 |
| JP | 2006-132532 A | 5/2006 |
| JP | 2012-23720 A | 2/2012 |

* cited by examiner

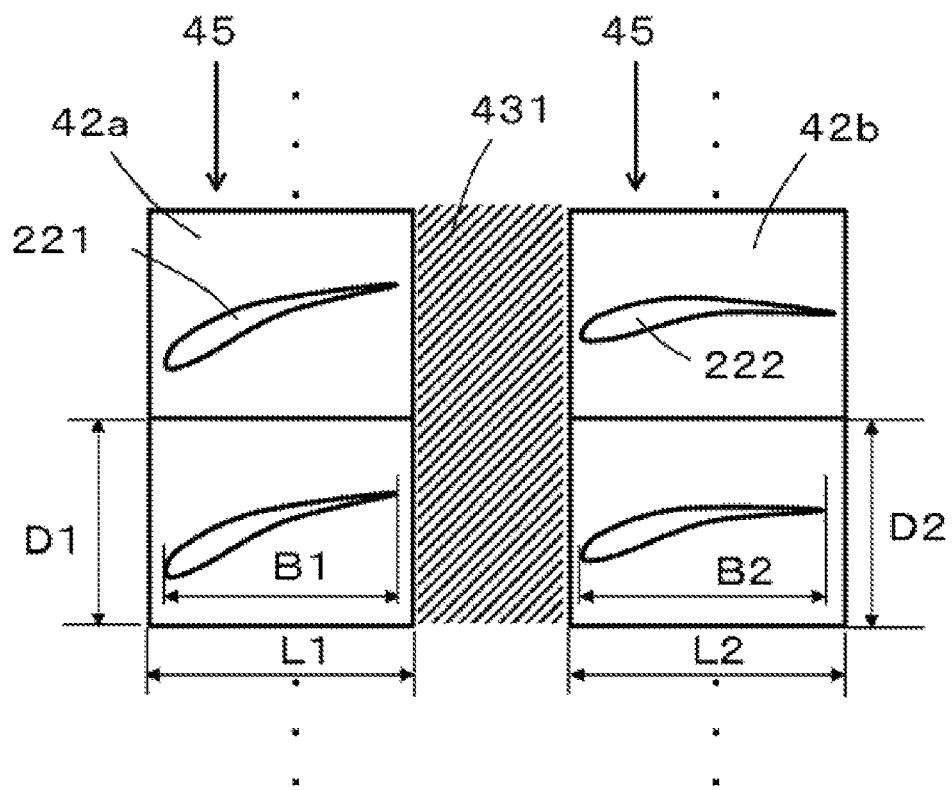

AXIAL COMPRESSOR, GAS TURBINE WITH AXIAL COMPRESSOR, AND ITS REMODELING METHOD

BACKGROUND OF THE INVENTION

1. Field of the Invention

The present invention relates to an axial compressor, a gas turbine including an axial compressor, and a method of remodeling an axial compressor.

2. Description of the Related Art

Axial compressors are widely used in various applications, such as jet engines, industrial gas turbines, airflow separators, dust collectors, vacuum pumps, wind tunnels, propane oxidative dehydrogenation devices, and pipeline pumping stations. In the axial compressor, the working gas flows along the rotational shaft of the rotor. As compared with the centrifugal compressor in which the working gas flows perpendicularly relative to the rotor shaft, the axial compressor yields a greater flow rate relative to its diameter, exhibiting a higher pressure ratio.

JP-2004-27926-A discloses an axial compressor applied to a gas turbine. JP-2004-27926-A discloses, as "a method of manufacturing gas turbine equipment applicable to various cycles", a technique that "a main part of the gas turbine equipment is set in advance based on generally established conditions, the number of stages of a compressor and a turbine to achieve conditions suitable for a desired cycle is set on the basis of the main part, and the compressor and the turbine having the set number of the stages are combined with each other to form part of the main part. When the set number of stages of the compressor or the turbine varies for different desired cycles, a substantially disk-shaped member having an outer circumference part that assumes part of an inner circumferential wall of a substantially annular flow passage of the compressor or the turbine is combined in the gas turbine having a smaller number of stages for a cycle so that distances between bearings in the gas turbine are equal to each other among a plurality of cycles."

JP-2006-132532-A discloses an exemplary stator vane mounting structure for a compressor. JP-2006-132532-A discloses "a stator vane assembly for a gas turbine engine" that is configured as follows. Specifically, the stator vane assembly "includes a plurality of stator vane doublets disposed at intervals in a circumferential direction. Each of the doublets includes a pair of stator vanes connected together at respective outer side stator vane platforms thereof. Each stator vane platform is configured so as to connect each doublet slidably relative to a vane rail that extends from a compressor casing extending in a circumferential direction at least partially around the stator vane assembly."

SUMMARY OF THE INVENTION

Consider, for example, a case in which an axial compressor is operated under an operating condition not anticipated at the time of designing the axial compressor, or a case in which the operating condition is changed in order, for example, to improve output. In such a case, airfoil reliability may not be sufficiently ensured on the rear stage side of the axial compressor. At this time, redesigning the profile of the airfoil in the rear stage of the compressor or changing the position at which the airfoil is mounted or the number of stages may at times solve the problem and achieve reliability in the airfoil. Aside from the airfoil reliability, thanks to a new technique developed after the design of an axial compressor, changing the airfoil profile, airfoil mounting position, or the number of stages in the axial compressor may cause performance of an existing gas turbine, such as output and efficiency, to be likely to improve.

Meanwhile, a dovetail groove formed in a compressor casing is generally designed to suit the size of a hub of the stator vane at initial design stages and it is difficult to change the dovetail structure. As a result, when the stator vane profile, vane mounting position, or the number of vane stages is to be changed, restrictions may be imposed on the degree of freedom in changing. It is therefore an object of the present invention to provide an axial compressor having relatively low restrictions when a stator vane profile, a vane mounting position, or the number of vane stages is to be changed.

To achieve the foregoing object, an aspect of the present invention provides an axial compressor comprising: a rotor as a rotational shaft; a plurality of rotor blades mounted on the rotor; a compressor casing that covers the rotor and the rotor blades; and a plurality of stator vanes mounted on the compressor casing, the rotor blades and the stator vanes being each disposed in a circumferential direction of the rotational shaft to form a rotor-blade cascade and a stator-vane cascade, respectively; the rotor-blade cascade and the stator-vane cascade being arranged in plural rows, respectively, in an axial direction of the rotational shaft; wherein the stator vane has a dovetail as a base for supporting a vane section, the compressor casing has at least one dovetail groove extending in the circumferential direction of the rotational shaft, the dovetail groove receiving the dovetail inserted therein to fix the stator vane, and two or more stator vanes, the stator vanes belonging to stator-vane cascades different from each other, are fixed in the one dovetail groove.

The present invention can provide an axial compressor having relatively low restrictions when a stator vane profile, a vane mounting position, or the number of vane stages is to be changed.

BRIEF DESCRIPTION OF THE DRAWINGS

The present invention will be described hereinafter with reference to the accompanying drawings.

FIG. 10 is a schematic view showing the stator vane mounting structure in the axial compressor according to the comparative example;

DESCRIPTION OF THE PREFERRED EMBODIMENTS

The following embodiments of the present invention exemplify an axial compressor for a gas turbine. Understandably, a configuration of each of the following embodiments is applicable to any machine in addition to the axial compressor for a gas turbine.

First Embodiment

Figure 2:
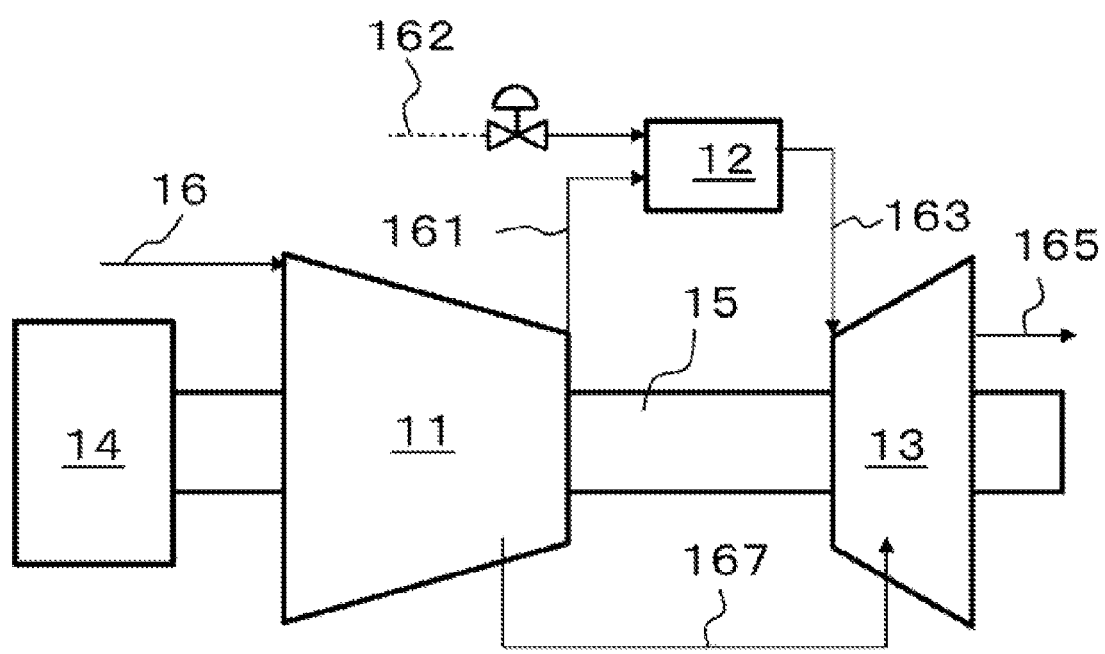
FIG. 2 is a schematic view showing a gas turbine.

FIG. 2 schematically shows a gas turbine configuration. The following describes an exemplary gas turbine system configuration with reference to FIG. 2. The gas turbine system includes an axial compressor 11, a combustor 12, and a turbine 13. The axial compressor 11 compresses air 16 to thereby generate high-pressure air (compressed air) 161. The combustor 12 mixes the high-pressure air 161 with a fuel 162 to burn a resultant mixture. The turbine 13 is rotatably driven by a combustion gas 163 at high temperatures. The axial compressor 11 and the turbine 13 are connected to a generator 14 via a rotational shaft 15.

A flow of a working gas will be described below. The air 16 as the working gas flows in the axial compressor 11 and is compressed by the axial compressor 11. The resultant high-pressure air 161 flows into the combustor 12. The combustor 12 mixes the high-pressure air 161 with the fuel 162 to burn the resultant mixture, so that the combustion gas 163 is generated. The combustion gas 163 rotates the turbine 13 and is then discharged as an exhaust gas 165 to an outside of the system. The generator 14 is driven by rotational driving power of the turbine 13, the rotational driving power being transmitted to the generator 14 through the rotational shaft 15 that connects the axial compressor 11 and the turbine 13.

Part of the high-pressure air 161 is bled as turbine rotor cooling air and sealing air from a rear stage of the axial compressor 11 and supplied to the side of the turbine 13 via an inner circumference side flow path of the gas turbine. This bleed air 167 is, while serving as the cooling air to cool the turbine rotor, guided into a high-temperature combustion gas flow path of the turbine 13. The cooling air functions also as the sealing air that prevents the high-temperature combustion gas from leaking from the high-temperature combustion gas flow path of the turbine 13 to a turbine rotor inside.

Figure 3:
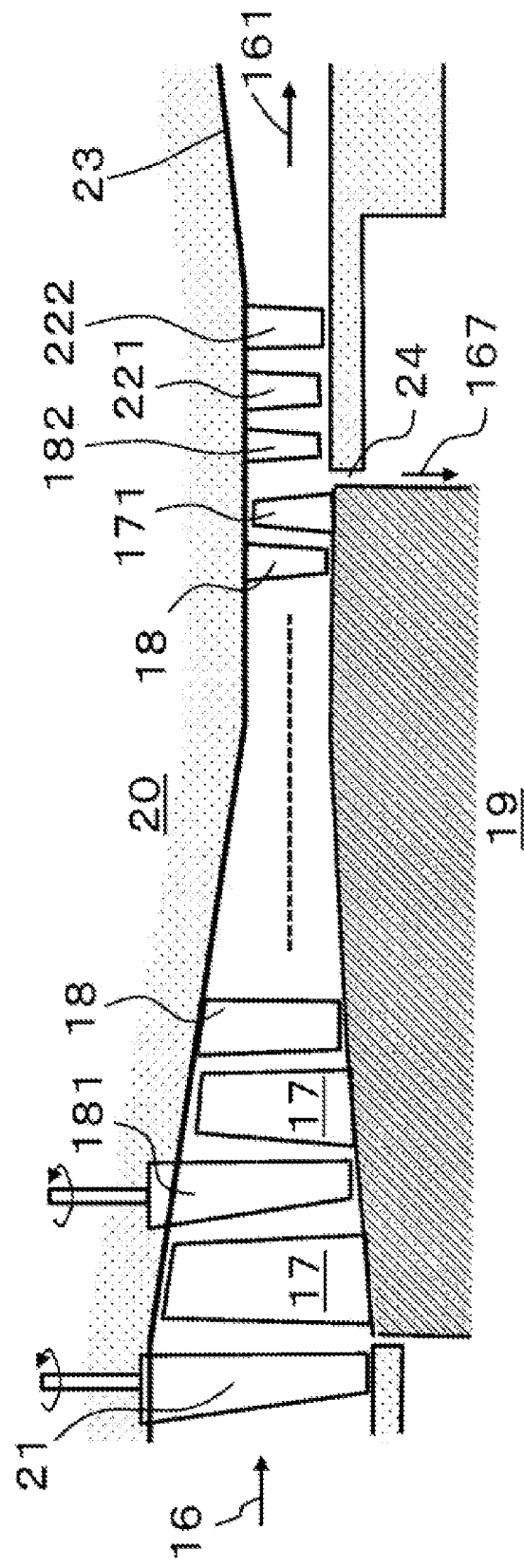
FIG. 3 is a schematic cross-sectional view showing an axial compressor.

FIG. 3 is a schematic view showing a multi-stage axial compressor. The axial compressor 11 includes a rotor 19, rotor blades, a compressor casing 20, and stator vanes. The rotor 19 is a rotational shaft. The rotor blades are mounted on the rotor 19. The compressor casing 20 surrounds the rotor 19 to thereby hermetically seal a working gas. The stator vanes are mounted on the compressor casing 20. An annular flow path is defined by the rotor 19 and the compressor casing 20 in the axial compressor 11. The rotor blades and the stator vanes are each disposed in a circumferential direction to form a rotor-blade cascade 17 and a stator-vane cascade 18, respectively. The rotor-blade cascade 17 and the stator-vane cascade 18 are alternately arranged in an axial direction. A single rotor-blade cascade 17 and a single stator-vane cascade 18 constitute a stage.

An inlet guide vane 21 (IGV) for controlling an intake flow rate is disposed upstream of the rotor-blade cascade 17 disposed on the most upstream side. The inlet guide vane 21 controls an inflow angle (specifically, an angle of attack) of the working gas that flows into the rotor-blade cascade 17 disposed on the rear side. The stator-vane cascade 18 on the front-stage side of the axial compressor 11 includes a variable mechanism for suppressing a rotating stall during startup. While FIG. 3 shows that the stator-vane cascade 18 including the variable mechanism is a variable stator-vane cascade 181 of a single stage, the variable stator-vane cascade may be disposed in a plurality of stages.

A last-stage stator-vane cascade 182, and a front exit guide vane (EGV) 221 and a rear exit guide vane (EGV) 222 each as an exit guide vane 22 are disposed downstream of a last-stage rotor-blade cascade 171. The EGVs 221, 222 are stator vanes mounted on the compressor casing 20 for the purpose of converting almost all of a rotating velocity component given by the rotor-blade cascades 17 in the annular flow path to the working gas to an axial velocity component. Additionally, a diffuser 23 is disposed downstream of the EGV 222 in order to introduce, while decelerating, the flow from the EGV 222 to the combustor 12.

It is noted that, while FIG. 3 shows the exit guide vanes 22 disposed in two cascades in the axial direction, the exit guide vane 22 may constitute a single cascade or more. In addition, an inner-circumference bleed slit 24 is formed in an inner circumference downstream of the last-stage rotor-blade cascade 171 and upstream of the last-stage stator-vane cascade 182. The inner-circumference bleed slit 24 bleeds the bleed air 167 used as the turbine rotor cooling air and sealing air.

The air 16 that flows as a working gas into the annular flow path of the axial compressor 11 is, while passing through the annular flow path, decelerated and compressed by each of the cascades to become a high-temperature, high-pressure air stream. Specifically, with rotation of the rotor-blade cascade 17 increasing fluid kinetic energy, the air 16, while being compressed, is conveyed in the axial direction. The air 16 is further compressed as its rotating velocity component is rectified and decelerated by the stator-vane cascade 18 and the kinetic energy is converted to pressure energy.

Because the rotor-blade cascade 17 gives the working gas the rotating speed, the flow to the last-stage stator-vane cascade 182 of the axial compressor 11 has an inflow angle of about 50 to 60 degrees. Meanwhile, for improved aerodynamic performance, desirably, the high-pressure air 161 that flows into the diffuser 23 disposed at the compressor outlet has an inflow angle of zero (axial velocity component). It is thus important for the stator-vane cascades comprising the last-stage stator-vane cascade 182 and the exit guide vanes (EGV) 221, 222 to convert the flow from about 60 degrees to 0 degrees.

A one-shaft gas turbine including the turbine 13 and the axial compressor 11 connected to each other by one shaft may be operated in one mode in which the IGV 21 of the axial compressor 11 is closed with the gas turbine combustion temperature maintained at the rated condition to thereby expand an operating load range of the gas turbine. When the IGV 21 is closed in such an operating mode, load on the rear-stage cascade of the compressor tends to increase and load on the last-stage stator-vane cascade 182 may particularly increase.

Figure 4:
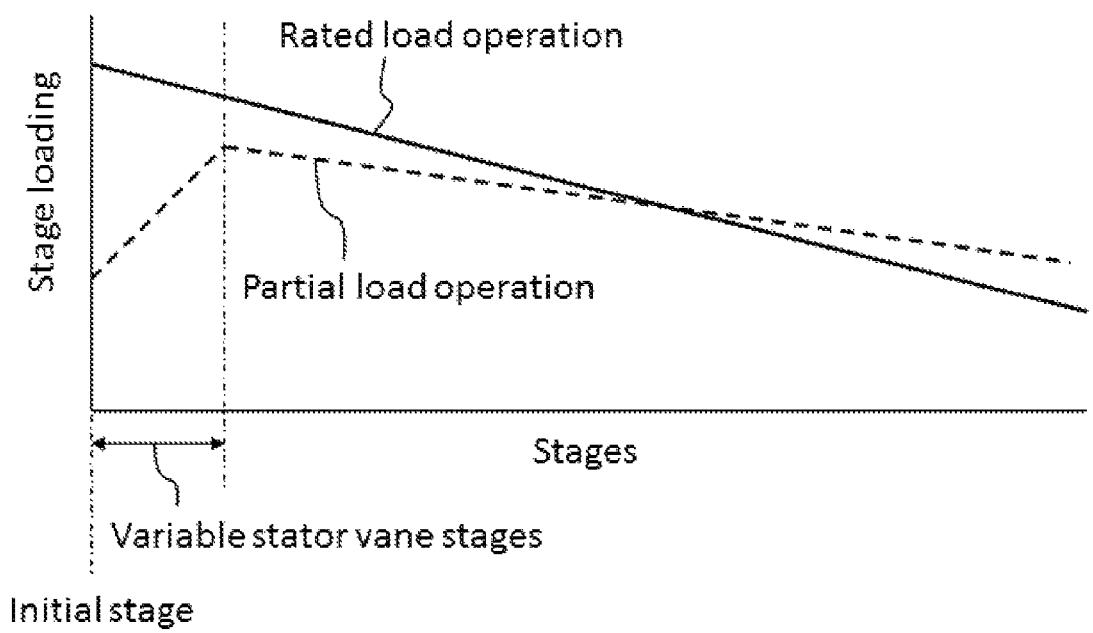
FIG. 4 is a conceptual view showing compressor stage load during a partial load operation.

FIG. 4 shows a stage pressure ratio distribution during a rated load operation of the axial compressor. In general, the stage pressure ratio distribution during the rated load operation of the axial compressor follows a substantially linearly decreasing pattern from the initial stage to the last stage as indicated by the solid line in FIG. 4. FIG. 4 also shows a stage pressure ratio distribution during a partial load operation in which the IGV 21 and the variable stator-vane cascade 181 are closed in a dotted line. During the partial load operation, the inflow angle to the rotor blade is small in the stage including the IGV 21 and the variable stator-vane cascade 181, so that the stage pressure ratio (stage loading) is small and the stage pressure ratio from the stage in rear of the variable stator-vane cascade 181 to the last stage decreases linearly. Meanwhile, a need exists to compensate for a pressure reduction in the stage of the variable stator-vane cascade 181 by other stages. This results understandably in higher stage pressure ratios (stage loading) in rear stages than that during the rated load operation.

In a compressor configuration having a plurality of stages each including the variable stator-vane cascade 181 on the front stage side shown in FIG. 3, the variable stator-vane cascades 181 in the stages are opened and closed through operative connection with the IGV 21. As a result, in the partial load operation with the IGV 21 closed, the variable stator-vane cascades 181 are also closed. Thus, while stage work is reduced in the stages including the variable stator-vane cascades 181, the pressure ratio in the entire compressor remains unchanged, which causes the load on the rear-stage cascades to further increase in the configuration having a plurality of stages each including the variable stator-vane cascade 181.

Moreover, because a side-wall boundary layer develops on the rear-stage side of the annular flow path, the axial velocity in a side wall portion further decreases. A greater inflow angle results in the side wall portion of the stator-vane cascade 18 with a resultant increase in load as compared with a mainstream portion. This causes the flow to tend to separate at the side wall portion on the rear-stage cascades than on the front-stage cascades.

Under a condition with low atmospheric temperatures, an increase in load on the rear-stage cascades is conspicuous during the partial load operation, thus degrading airfoil reliability and aerodynamic performance. When the airfoil load reaches a limit line, the cascade is subjected to fluid excitation through separation. When cascade vibrational stress exceeds a permissible stress value, the cascade is more likely to be damaged.

Another known gas turbine is a two-shaft gas turbine that includes a high-pressure turbine and a low-pressure turbine and a rotational shaft that connects the high-pressure turbine to a compressor is different from a rotational shaft that connects the low-pressure turbine to a load device such as a generator. In a partial load operating mode, the two-shaft gas turbine closes the IGV 21 or the like to reduce the intake flow rate, thereby producing smaller compressor driving power, in order to balance the high-pressure turbine output and the compressor driving power. In such an operating mode in which the IGV 21 and the variable stator-vane cascade 181 are closed, load increases, as described above, on the rear-stage cascade, particularly the last-stage stator-vane cascade 182, which poses a challenge of achieving performance and reliability.

As described above, the axial compressor 11 of the gas turbine is required to achieve performance and reliability not only in the rated operation, but also during the startup and in the partial load operation, and in response to changes in the atmospheric temperature. Particularly at the startup, and during the partial load operation and the low-temperature condition, the load increases on the last-stage stator-vane cascade 182 and the exit guide vane 22. Thus, the axial compressor 11 is designed and manufactured so as to be capable of ensuring reliability of the last-stage stator-vane cascade 182 and the exit guide vane 22 is under various operating conditions anticipated in design stages.

A need may, however, arise in which, after the gas turbine has been built, the gas turbine system needs to be modified or operated in an operating condition not previously anticipated, with the aim of enhancing the output or efficiency, or reducing NOx.

Figure 5:
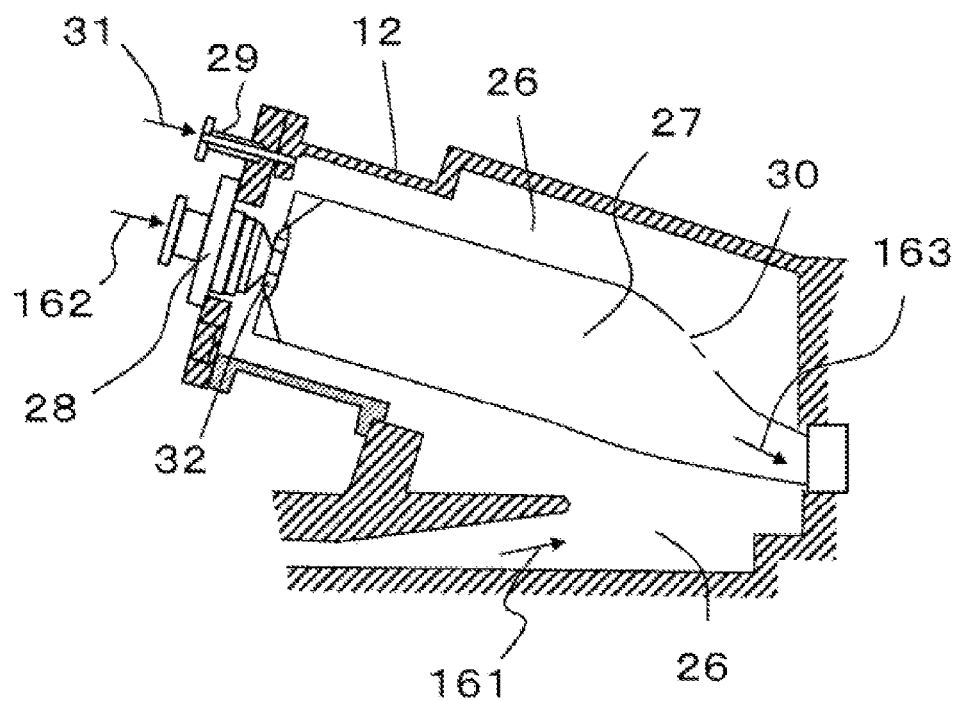
FIG. 5 is a schematic view showing a combustor including a steam injection mechanism.

A first exemplary technique for enhancing performance of the gas turbine by installing an additional mechanism in addition to the gas turbine main unit is steam injection into the combustor. A configuration of a combustor 12 including a steam injection mechanism will be described below with reference to FIG. 5. The combustor 12 of the steam injection type gas turbine includes a casing 26, a combustion chamber 27, a fuel nozzle 28, and a steam nozzle 29.

The high-pressure air 161 compressed by the axial compressor 11 flows into the annular casing 26. Part of the high-pressure air 161 flows into the combustion chamber 27 through a dilution hole 30 formed in a circumferential wall on a downstream side of the combustion chamber 27. The remainder of the high-pressure air 161 is mixed inside the casing 26 with steam 31 injected from the steam nozzle 29 disposed close to the fuel nozzle 28 and reduces its temperature. The compressed air mixed with the steam 31 inside the casing 26 is given a swirling component by a swirler 32 and flows as a swirl flow into the combustion chamber 27.

The compressed air mixed with the steam 31 and flowing into the combustion chamber 27 as swirled by the swirler 32 is mixed with the fuel 162 injected from the fuel nozzle 28 and burned, and is sent as the combustion gas 163 to the turbine 13 with the steam.

Increasing the combustion temperature of the combustor is effective in making gas turbine operation even more efficient and produce higher output. The amount of NOx produced unfortunately increases exponentially with the increase in the combustion temperature. The NOx, however, occurs in a diffusion flame at a locally hot spot. Thus, by injecting the steam 31 into the combustor 12, the combustion temperature of a high-temperature zone in the combustor can be reduced to thereby reduce the NOx. Injecting the steam 31 reduces the combustion temperature in the combustor 12, it is also possible to increase the gas turbine output by charging more fuel.

In the combustor 12 into which the steam 31 is injected, a greater amount of compressed fluid is introduced with the increasing amount of steam 31 injected, the compressed fluid being composed of the high-pressure air 161 delivered from the axial compressor 11 and the steam 31. As a result, the combustion gas 163 produced after the compressed fluid is burned in the combustor 12 is hard to flow out smoothly to the turbine side, causing pressure inside the casing 26, or a delivery pressure of the axial compressor 11, to build up. Specifically, the pressure ratio of the axial compressor 11 increases with the increase in a steam injection amount. The pressure ratio per stage of the airfoils of the axial compressor 11 accordingly increases with a resultant increase in airfoil loading.

Figure 6:
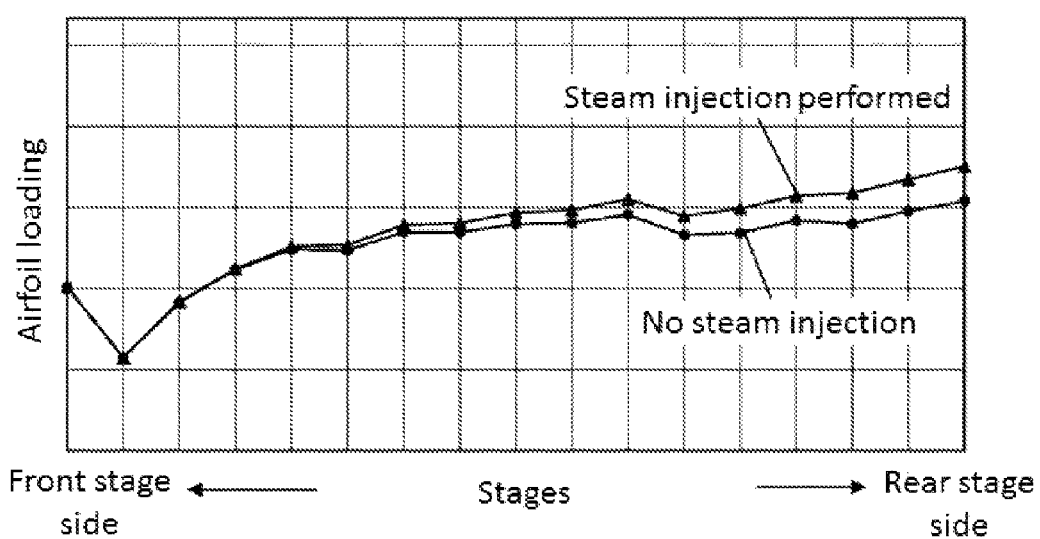
FIG. 6 is an airfoil loading conceptual diagram of an axial compressor in a gas turbine including a steam injection mechanism.

FIG. 6 shows airfoil loading per stage in the axial compressor 11 of the gas turbine including the steam injection mechanism. The effect on increasing pressure of the combustor 12 from the performance of the steam injection is more conspicuous in rear stages of the axial compressor 11. As shown in FIG. 6, the airfoil loading tends to be greater in rear stages, as compared with a case in which no steam injection is performed.

As described above, the steam injection is an effective technique for reducing NOx and improving gas turbine output and can be implemented by simply installing the steam injection mechanism without modifying the gas turbine main unit. Thus, the steam injection mechanism may be newly added with the aim of improving output and reducing NOx in an existing gas turbine. Even if the steam injection mechanism is included when the gas turbine is originally built, a need may arise to increase the steam injection amount from a level initially anticipated in order to improve the output that is short of a requirement.

The airfoils of the axial compressor 11 for the gas turbine are optimally designed such that adiabatic efficiency of the compressor is optimum under the operating condition assumed at the time of building and that the airfoil reliability can be achieved even under the anticipated severest operating conditions such as at low ambient temperatures. As a result, when the steam injection is newly added or when the steam injection amount is to be increased to a level more than previously anticipated with the aim of improving output, it may become difficult to achieve sufficient reliability in rear-stage airfoils of the axial compressor 11.

Figure 7:
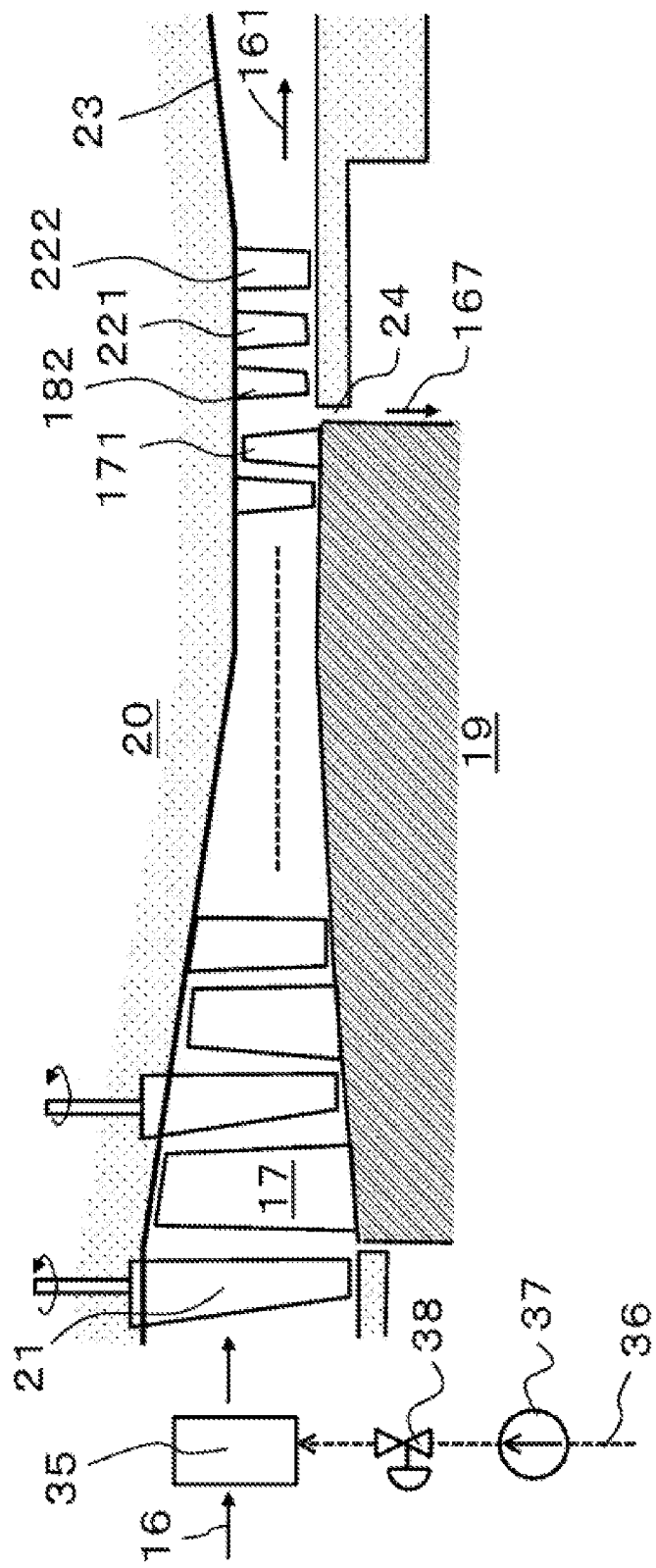
FIG. 7 is a schematic view showing an axial compressor including a water atomization cooling mechanism.

A second exemplary technique for enhancing performance of the gas turbine by installing an additional mechanism in addition to the gas turbine main unit is water atomization cooling. A water atomization cooling mechanism sprays fine droplets at the inlet of the axial compressor. A flow of the working gas in the axial compressor 11 having a water atomization cooling mechanism will be described below with reference to FIG. 7. The axial compressor 11 draws in the air 16 from the atmosphere. A water atomization cooling system 35 sprays water 36 into the air 16 supplied to the axial compressor 11 from the atmosphere. The sprayed water 36 is pressurized by a high-pressure pump 37 and adjusted by a flow control valve 38 to produce a predetermined flow rate. A spray nozzle inside the water atomization cooling system 35 then turns the water 36 into fine particles that are sprayed into the air 16.

Part of the fine droplets evaporates before being drawn into the axial compressor 11. The latent heat of vaporization involved herein reduces the temperature of the working gas. This allows intake air having a lower temperature and higher density than the atmosphere to be obtained, enabling the output of the gas turbine to be increased. In addition, the higher the atmospheric temperature, the more the intake air flow rate (mass flow rate) (specifically, a greater inlet air cooling effect can be achieved). Thus, the use of the water atomization cooling system 35 suppresses reduction in the output in summer and fluctuations in gas turbine output arising from variations in atmospheric temperatures throughout the year.

Of the fine droplets, those that do not evaporate before flowing into the axial compressor 11 flow as droplets into the inside of the axial compressor 11. These droplets evaporate, while flowing through areas between the rotor blades and the stator vanes in the axial compressor 11, to thereby reduce the temperature of the working gas being compressed. This intermediate cooling effect allows compression characteristics to approach isothermal compression, which reduces driving power of the axial compressor 11. This results in improved gas turbine efficiency. The droplets introduced into the axial compressor 11 completely evaporate before being discharged from the compressor. The working gas is discharged from the compressor.

Figure 8:
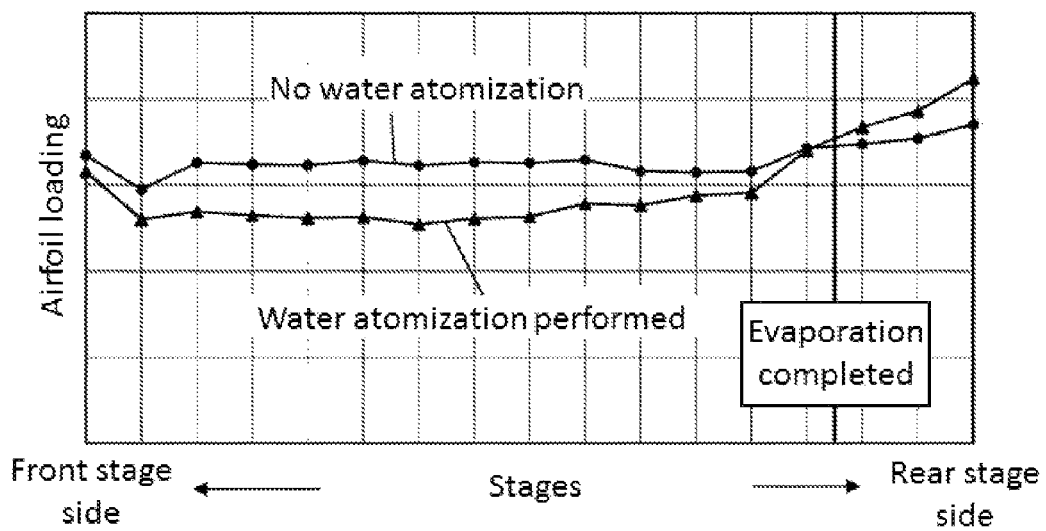
FIG. 8 is an airfoil loading conceptual diagram of the axial compressor including the water atomization cooling mechanism.

Airfoil loading in the axial compressor having a water atomization cooling mechanism will be described below with reference to FIG. 8. In the axial compressor having the water atomization cooling mechanism, the droplets evaporate in areas from front stages to intermediate stages in the axial compressor 11, resulting in an increased volumetric flow rate of the working gas. Thus, because the axial velocity of the working gas increases and incidence relative to the compressor airfoils relatively decreases in the areas from the front stages to the intermediate stages in the axial compressor 11, the airfoil loading tends to decrease. In contrast, in the rear stages of the compressor where the droplets have evaporated, the cooling effect of the working gas achieved by the water atomization cooling causes density of the working gas to increase, which increases pressure of the working gas and thus the airfoil loading.

As described above, the water atomization cooling is effective technique for improving the gas turbine output and compressor efficiency and can be implemented by simply installing the water atomization cooling mechanism without modifying the gas turbine main unit. Hence, there may be a case in which a water atomization cooling mechanism is newly added with the aim of improving output and efficiency of an existing gas turbine. Another case may be such that, even with a gas turbine that originally includes a water atomization cooling mechanism at the time of building, a need may arise to increase a water atomization amount than that originally estimated with aim of improving the output because of a short output encountered, for example, in summer.

Meanwhile, the airfoils of the axial compressor for the gas turbine are optimally designed such that adiabatic efficiency of the compressor is optimum under the operating condition assumed at the time of building and that the airfoil reliability can be achieved even under the anticipated severest operating conditions such as at low ambient temperatures. As a result, when the water atomization cooling mechanism is newly added or when the water atomization amount is to be increased to a level more than that previously anticipated with the aim of improving output and efficiency, it may become difficult to achieve sufficient reliability in rear-stage airfoils of the axial compressor.

Such being the case, when a steam injection mechanism or an water atomization cooling mechanism is to be newly installed or when the steam injection amount or the water atomization amount is to be increased to a level more than that anticipated, it may become impossible to achieve sufficient reliability of the airfoils in the rear stages of the axial compressor 11. In addition, achieving sufficient reliability of the airfoils in the rear stages of the axial compressor 11 may also become impossible, when the gas turbine needs to be operated in conditions different from those anticipated during the initial design stages, for example, when the bleed amount is to be changed or the IGV schedule is to be changed.

Aside from the airfoil reliability problem, if a new technique is developed after a gas turbine has been designed, there may be a case in which improving performance of the existing gas turbine can be expected by changing the airfoil profile, airfoil mounting positions, or the number of airfoil stages of the rear-stage airfoils of the axial compressor. Examples of airfoil changes that may achieve anticipated improved performance of the gas turbine include changing the airfoil profile, and changing the number of airfoil stages, such as a tandem airfoil and a splitter airfoil.

The tandem airfoil is a configuration of airfoils, in which airfoils having a substantially identical size are disposed close to each other back and forth in the axial direction of the rotational shaft. The configuration can achieve an effect of suppressing boundary layer separation in the front and rear airfoils because of effects from the front and rear airfoils on the working gas interfering with each other. The splitter airfoil is a configuration of airfoils, in which an airfoil having a relatively short chord length as compared with an upstream airfoil is disposed close to the upstream airfoil, which may, for example, achieve an effect of suppressing boundary layer separation of the upstream airfoil.

As described above, in the axial compressor, a need may arise to change the airfoil profile, airfoil mounting positions, or the number of cascade stages for stator vanes including the exit guide vane 22 and the last-stage stator-vane cascade 182, in order to ensure airfoil reliability or improve performance of the axial compressor when the operating condition is changed from that anticipated at the design stages. In a stator vane mounting structure in an axial compressor according to a comparative example, however, a dovetail groove in a casing as a groove for attaching an airfoil to the casing is generally designed to suit the size of a hub of the stator vane at the initial design stages. This poses a problem in which restrict of the dovetail shape restricts the degree of freedom in changing the airfoil profile, airfoil mounting positions, or the number of cascade stages for stator vanes.

Figure 9:
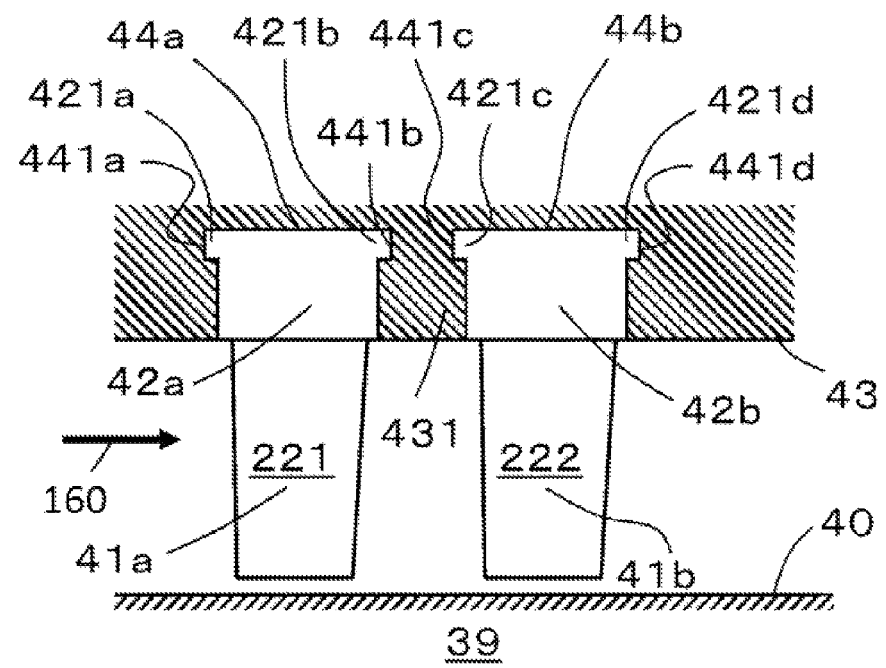
FIG. 9 is a schematic cross-sectional view showing a stator vane mounting structure in an axial compressor according to a comparative example.

A mounting structure of the exit guide vane 22 or the stator-vane cascade 18 in an axial compressor 39 according to a comparative example will be described below with reference to FIG. 9. FIG. 9 is a cross-sectional view showing an area around the exit guide vanes 221, 222 of the axial compressor 39 according to the comparative example. FIG. 9 shows an example in which the exit guide vanes are disposed in two stages in order to reduce load per stage on the exit guide vane 22. The exit guide vanes 221, 222 include vane sections 41a, 41b and dovetails 42a, 42b, respectively, integrally machined. The vane sections 41a, 41b are disposed in a gas path to compress or rectify the working gas. The dovetails 42a, 42b assume bases having protrusions 421a, 421b, 421c, 421d, respectively, called axial dovetails that protrude in the rotational shaft direction for supporting the vane sections 41a, 41b. A compressor casing 43 has dovetail grooves 44a, 44b in which the dovetails 42a, 42b are fitted, the dovetail grooves 44a, 44b having substantially the same shapes as the dovetails 42a, 42b.

The protrusions 421a, 421b of the dovetail 42a are fitted in recesses 441a, 441b, respectively, formed in the dovetail groove 44a. Similarly, the dovetail 42b also has the protrusions 421c, 421d that are fitted in recesses 441c, 441d, respectively, formed in the dovetail groove 44b. Thereby, the exit guide vanes 221, 222 are supported so as not to fall in the annular flow path.

During compressor operation, the exit guide vanes 221, 222 receive a gas bending force from the working gas. The gas bending force is transmitted to the compressor casing 43 via the dovetails 42a, 42b. In addition, the exit guide vanes 221, 222 receive a rotating force because of a balance of moment. To offset this rotating force, the dovetail protrusions 421a, 421b, 421c, 421d receive a compressive force from the casing. Since the dovetail protrusions 421a, 421b, 421c, and 421d, are subject to a bending stress as described above, they are designed to have a sufficient margin of bending stress relative to material strength.

A dovetail shape of the axial compressor 39 according to the comparative example will be described below with reference to FIG. 10. FIG. 10 is a view showing hub sections of the exit guide vanes 221, 222 and surfaces of the dovetails 42a, 42b facing the gas path, as viewed from the side of the rotational shaft 15. The exit guide vanes 221, 222 are fitted into the compressor casing 43 by inserting the exit guide vanes 221, 222 in a circumferential direction relative to the rotational shaft 15 as in a mounting direction 45 shown in FIG. 10.

If the dovetails 42a, 42b are designed to be excessively large relative to the airfoil profile of the exit guide vanes 221, 222, a casing neck 431 shown in FIG. 9 comes to have a narrow width and it is concerned that casing strength is reduced. Thus, axial widths L1, L2 of the dovetails 42a, 42b are designed to be small in such a range in which axial lengths B1, B2 of the exit guide vanes 221, 222 plus fillet widths sufficiently fall and the axial widths L1, L2 are substantially equivalent to axial lengths of the exit guide vanes 221, 222. Specifically, the ratio of the axial widths L1, L2 to the axial lengths B1, B2 of the exit guide vanes 221, 222 is, for example, 1.5 or less. Meanwhile, D1 and D2 are determined such that the airfoils in number designed aerodynamically can be disposed in the circumferential direction.

As described above, in the dovetail shape in the comparative example, the axial lengths B1, B2 of the exit guide vanes 221, 222 and the axial widths L1, L2 of the dovetails 42a, 42b are designed to be substantially equal to each other. Thus, when the airfoil profile, airfoil mounting positions, and the number of cascades of the stator vanes mounted in an existing axial compressor 39 are to be changed, the hub of the exit guide vane needs to be designed not to protrude from the dovetails 42a, 42b, so that the degree of freedom in changing is restricted.

Figure 1A:
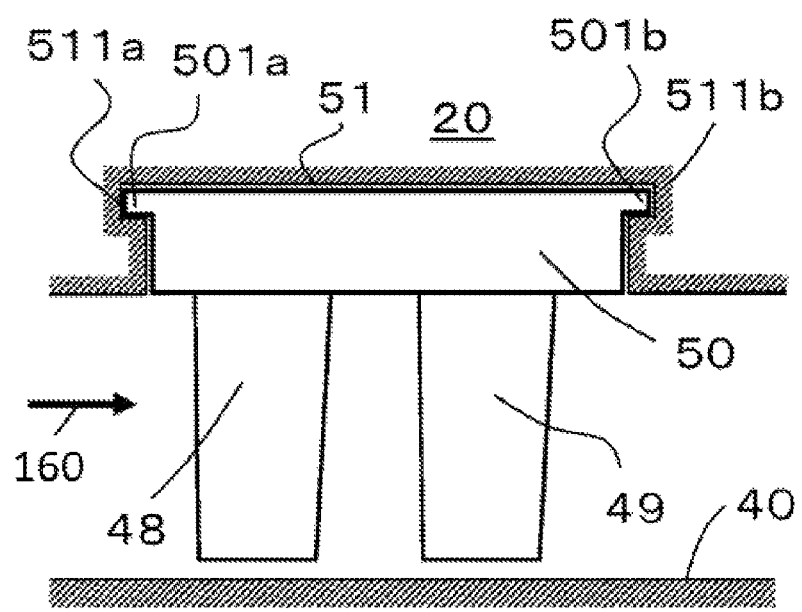
FIGS. 1A and 1B are schematic views showing a stator vane mounting structure according to a first embodiment.
Figure 1B:
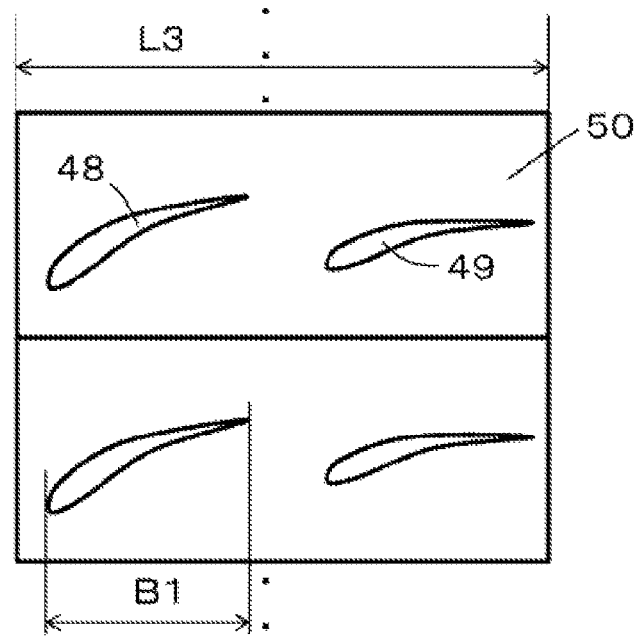

A stator vane mounting structure according to the first embodiment of the present invention will be described below with reference to FIGS. 1A and 1B. FIG. 1A shows exit guide vanes to which the first embodiment of the present invention is applied, as viewed along a rotating direction of the rotational shaft. FIG. 1B shows the exit guide vanes to which the first embodiment of the present invention is applied, as viewed from a center of rotation.

The axial compressor 11 according to the first embodiment includes the rotor 19, the compressor casing 20, the rotor-blade cascades 17 forming a plurality of stages, the stator-vane cascades 18 forming a plurality of stages, and exit guide vanes 48, 49 forming a plurality of stages. The rotor 19 constitutes the rotational shaft 15 that passes through substantially a center of the compressor 11. The compressor casing 20 covers the rotor 19. The rotor-blade cascades 17 are mounted on the rotor 19. The stator-vane cascades 18 are mounted on the compressor casing 20. The exit guide vanes 48, 49 are disposed at the exit of the axial compressor 11.

In the first embodiment, the two exit guide vanes 48, 49, the exit guide vanes 48, 49 belonging to stator-vane cascades different from each other, are mounted on an integrated dovetail 50. The integrated dovetail 50 has protrusions 501a, 501b for fixing the integrated dovetail 50 to the compressor casing 20. The compressor casing 20 has a dovetail groove 51 formed therein. The dovetail groove 51 has recessed grooves 511a, 511b into which the protrusions 501a, 501b of the integrated dovetail 50 are fitted. Specifically, the exit guide vanes 48, 49, each belonging to its unique stator-vane cascade, are mounted in the compressor casing 20 via the integrated dovetail 50.

Disposing the exit guide vanes 48, 49, each belonging to its unique stator-vane cascade, in the integrated dovetail 50 as in the first embodiment requires a large axial width L3 of the dovetail 50 relative to the axial length B1 per airfoil. The ratio of L3 to B1 is, for example, 2 or more. In the structure according to the first embodiment, the integrated dovetail 50 has the axial width L3 larger than that of the dovetail 42 according to the comparative example and extends over a plurality of stages of the exit guide vanes 48, 49. Thus, when the exit guide vanes 48, 49 are to be redesigned, when the number of stages involved is to be changed, or when the mounting positions of the exit guide vanes 48, 49 are to be changed, the profile, axial position, and the number of stages of the exit guide vane can be relatively freely designed.

The structure according to the first embodiment, while being applicable to the stator vane in any given stage, is effectively applicable particularly to a plurality of stator vane stages disposed consecutively with no rotor-blade cascades therebetween, such as the exit guide vanes disposed in the rear stage of the axial compressor. Disposing stator vanes, the stator vanes belonging to consecutive upstream and downstream stator-vane cascades in the rear stage of the axial compressor, in the integrated dovetail allows even higher reliability and the degree of freedom in changing the profile and axial mounting position of the airfoil or the number of airfoils to be achieved.

In the structure according to the first embodiment, the dovetail 50 has an axial width that is more than doubles the axial length of a single stage stator vane. Assume, for example, a case in which the stator vane profile in the rear stage of the axial compressor needs to be changed in order to ensure airfoil reliability of the stator vane in the rear stage of the axial compressor to respond to a change in the operating condition of the axial compressor from that in the design stage. Assume another case in which the stator vane profile in the rear stage of the axial compressor needs to be changed in order to improve performance of the existing axial compressor. In such cases, as compared with a dovetail designed to have an axial width substantially equal to an axial length of an initial stator vane, restrictions of changes imposed by the size of the dovetail are relatively small and it is easy to change the profile and axial mounting position of the airfoil, and the number of airfoils.

Figure 11A:
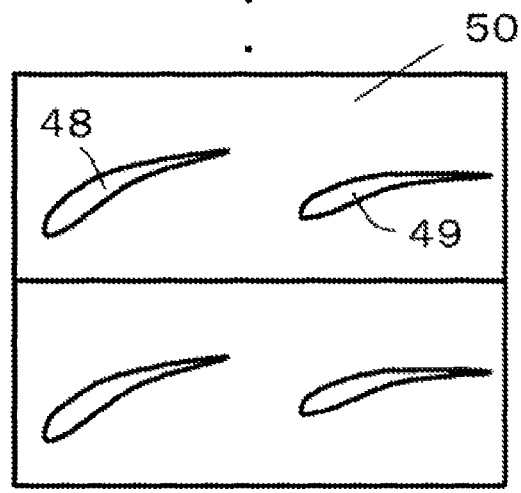
FIGS. 11A and 11B are schematic views showing a method of changing stator vanes in two stages to stator vanes in a single stage.
Figure 11B:
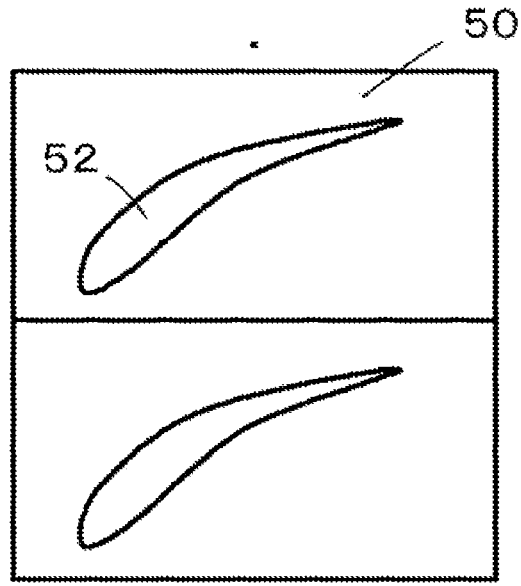

A first specific example of a method of remodeling the airfoil profile in the dovetail structure according to the first embodiment will be described below with reference to FIGS. 11A and 11B. FIG. 11A shows the structure before the remodeling and FIG. 11B shows the structure after the remodeling. As shown in FIGS. 11A and 11B, one method of remodeling the airfoil profile in the dovetail structure according to the first embodiment is to change the exit guide vanes 48, 49 designed to be in two upstream and downstream stages to a single-stage exit guide vane 52. Stiffness of the airfoil can be improved by changing the exit guide vanes 48, 49 in two stages to the single-stage exit guide vane 52 to thereby increase a chord length and an airfoil thickness. This enables sufficient reliability to be ensured even with an increase in airfoil loading on the exit guide vanes from design stage as a result of, for example, adding to the existing gas turbine a mechanism affecting the airfoil loading, such as water atomization cooling or steam injection. Additionally, decreasing the number of airfoil stages simplifies machining processes, which can achieve an effect of cost reduction.

In this case, the circumferential width of the dovetail 50 may also be changed, so that the number of airfoils per stage can be changed. In FIG. 11B, the circumferential width of the dovetail 50 is changed relative to FIG. 11A to thereby change the number of stages of the exit guide vanes to one and change the number of airfoils per stage. Changing the number of stages of the exit guide vanes as described above is difficult for the dovetail structure of the comparative example including one dovetail for each stator-vane cascade. While FIGS. 11A and 11B show an example in which the exit guide vanes 48, 49 in two stages are changed to the single-stage exit guide vane 52, the number of stages of the exit guide vanes can also be increased from two to three.

Figure 12:
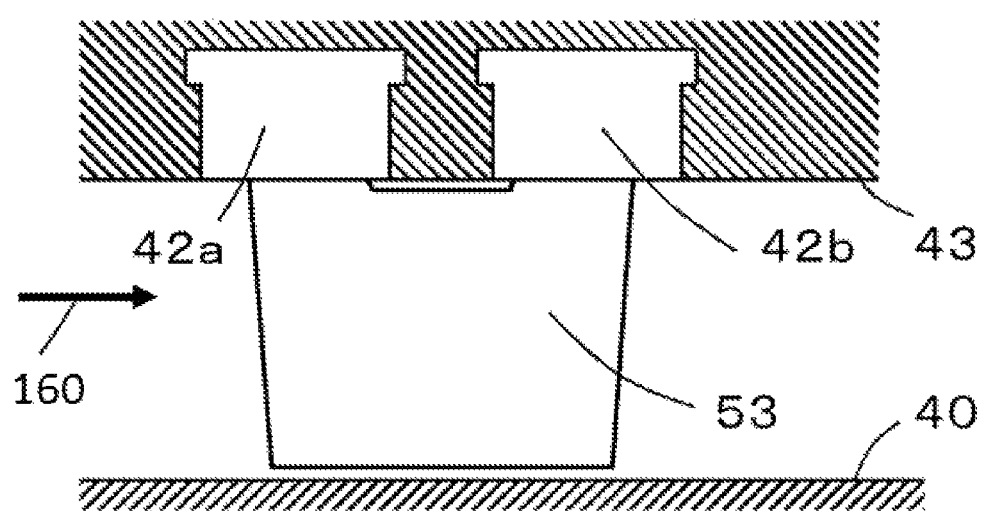
FIG. 12 is a schematic view showing a structure in which a single airfoil is attached to dovetails extending over a plurality of stages.

If the dovetail grooves are the dovetail grooves 44a, 44b of the comparative example when a need arises to change the exit guide vanes to a single stage configuration, a method is possible in which an exit guide vane 53 in a single stage is formed to include a plurality of dovetails 42a, 42b as shown in FIG. 12. Even if the dovetails of the exit guide vanes 221, 222 of the existing axial compressor 39 that requires the remodeling are the dovetails 42a, 42b of the comparative example, the foregoing method allows the number of airfoil stages to be changed without machining the compressor casing 43.

Figure 13A:
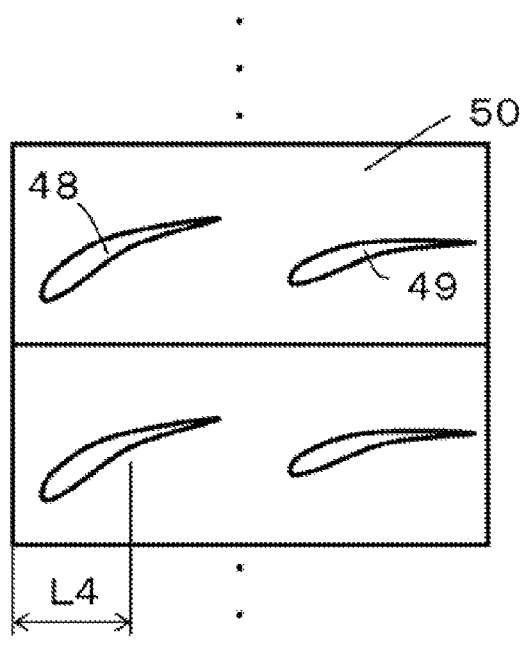
FIGS. 13A and 13B are schematic views showing mounting positions of stator vanes being changed in the first embodiment.
Figure 13B:
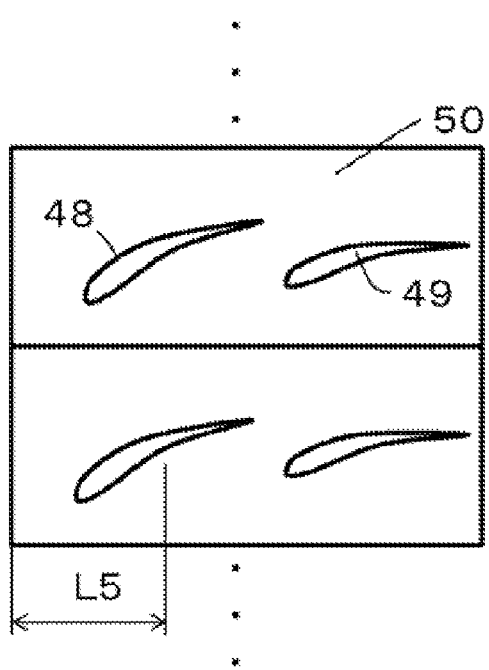

A second specific example of a method of remodeling the exit guide vanes 48, 49 in the dovetail structure according to the first embodiment will be described below with reference to FIGS. 13A and 13B. FIG. 13A shows the structure before the remodeling and FIG. 13B shows the structure after the remodeling. As shown in FIGS. 13A and 13B, another method of remodeling the airfoil profile in the dovetail structure according to the first embodiment is to change the mounting position of the front exit guide vane 48 to the downstream side. In FIG. 13B, relative to FIG. 13A, the mounting position of the front exit guide vane is changed from L4 to L5 (L4<L5).

The exit guide vane 48 receives an exciting force as affected by a slipstream produced by a rotor blade in a further upstream stage not shown. When, for example, a mechanism affecting the airfoil loading, such as water atomization cooling or steam injection, is newly added to the existing gas turbine or when the existing gas turbine is operated under conditions not anticipated, the exit guide vane 48 may receive an increased exciting force. In such cases, disposing the stator vanes of the exit guide vane 48 on a further downstream side reduces the effect of the slipstream from the rotor blade of the front stage, thus ensuring reliability of the airfoils. It is noted that it is difficult to change the mounting position of the exit guide vane 48 in the dovetail structure of the comparative example in which one dovetail is assigned to one stage of stator vanes.

A third specific example of a method of remodeling the exit guide vanes 48, 49 in the dovetail structure according to the first embodiment will be described below. In the dovetail structure of the comparative example in which one dovetail is assigned to one stage of stator vanes, it is difficult to change the exit guide vanes 48, 49 to tandem airfoils 54, 55 or splitter airfoils 56, 57.

Figure 14:
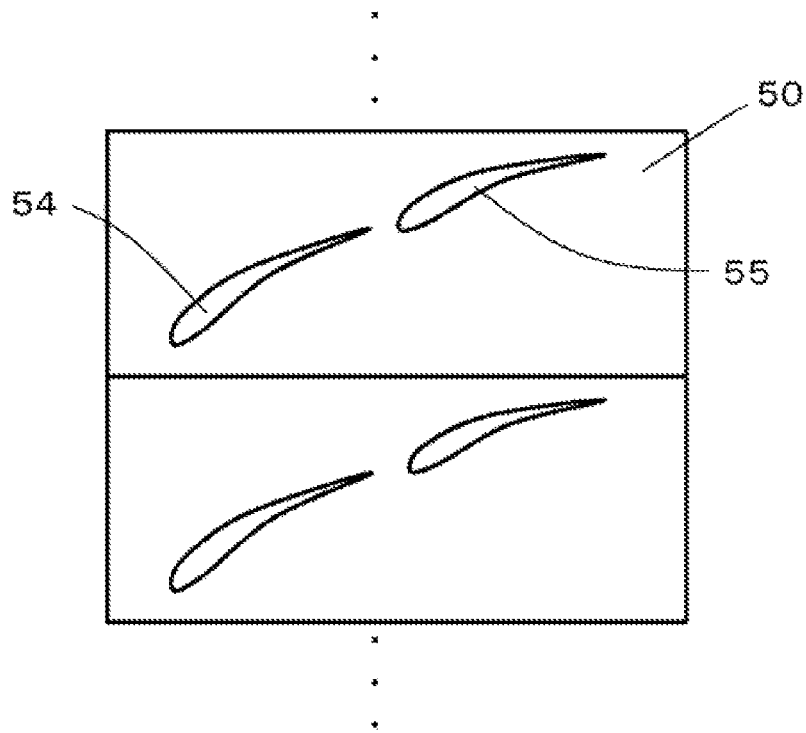
FIG. 14 is a schematic view showing the stator vanes being changed to tandem airfoils in the first embodiment.
Figure 15:
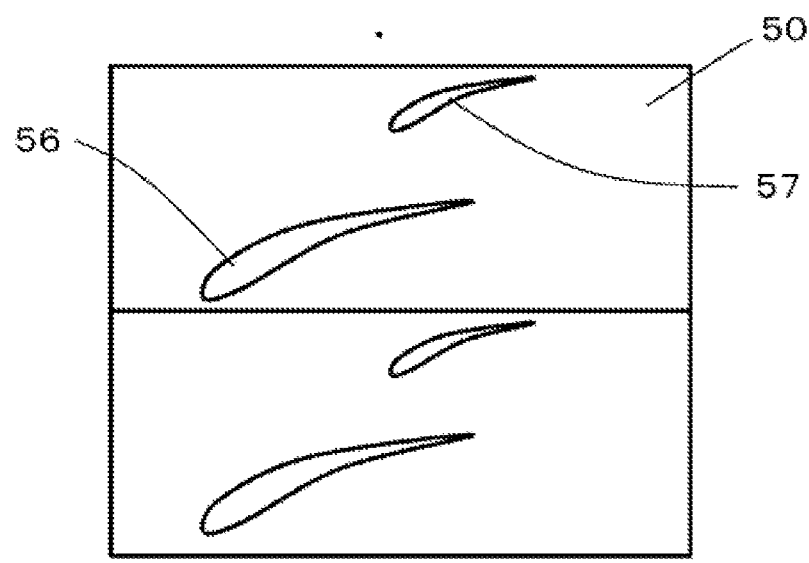
FIG. 15 is a schematic view showing the stator vanes being changed to splitter airfoils in the first embodiment.

The dovetail structure according to the first embodiment, however, allows the exit guide vanes 48, 49 to be changed to the tandem airfoils 54, 55 shown in FIG. 14 or to the splitter airfoils 56, 57 shown in FIG. 15. By changing the exit guide vanes 48, 49 to the tandem airfoils 54, 55 or to the splitter airfoils 56, 57 as in this remodeling example when, for example, the airfoil loading on the exit guide vanes 48, 49 increases relative to its level at the time of designing, airfoil loading may be reduced by suppressing boundary layer separation of the airfoil surface through interaction of the front and rear tandem airfoils 54, 55 or the front and rear splitter airfoils 56, 57.

In addition, the dovetail structure according to the first embodiment offers a higher degree of freedom in changing the airfoil profile as compared with the dovetail structure according to the comparative example even when the mounting angle of the exit guide vanes 48, 49 is changed in order to reduce incidence in the exit guide vanes 48, 49 or the chord length of the exit guide vanes 48, 49 is changed to be increased. Thus, the dovetail structure according to the first embodiment offers an advantage that airfoil design change is easy when the airfoil loading on the exit guide vanes 48, 49 increases relative to its level at the time of designing or performance of the axial compressor 11 is expected to be improved by the change of the exit guide vanes 48, 49.

Figure 16A:
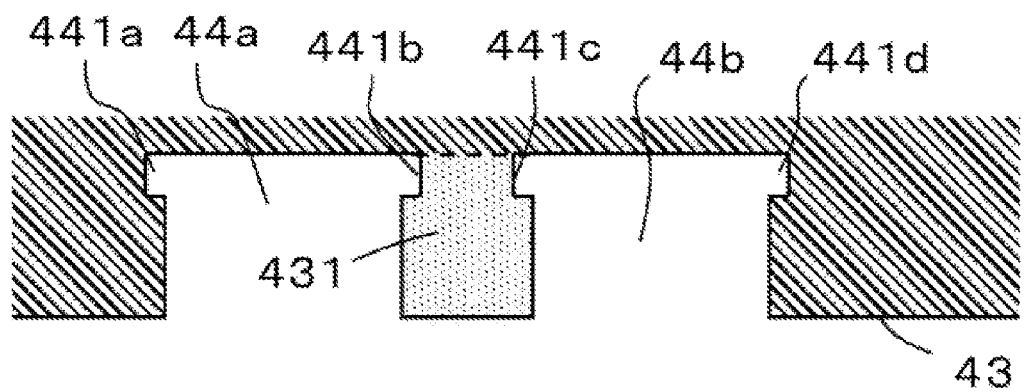
FIGS. 16A and 16B are schematic views showing remodeling of a compressor casing in the axial compressor according to the comparative example.
Figure 16B:
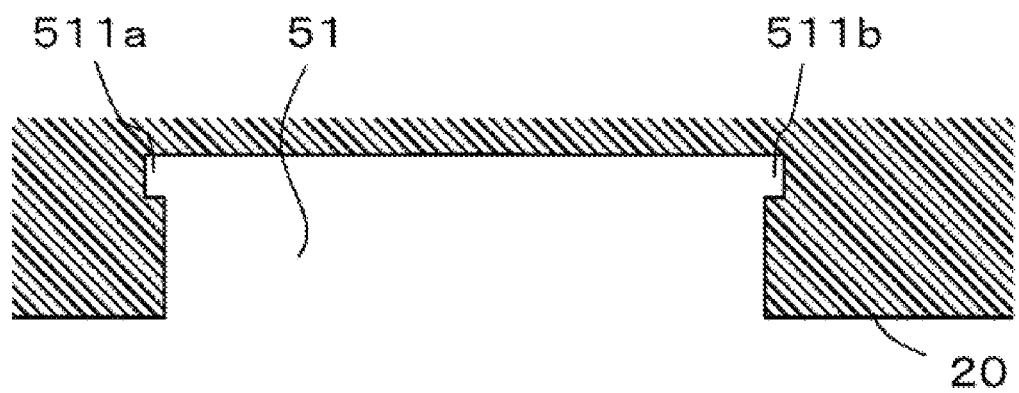

The following describes, with reference to FIGS. 16A and 16B, a method of remodeling applicable when the exit guide vanes of an existing axial compressor have the structure of the dovetails 42a, 42b according to the comparative example. FIG. 16A is a cross-sectional view showing the compressor casing 43 of the axial compressor 39 that includes the two-stage exit guide vanes 221, 222, which include the dovetails 42a, 42b according to the comparative example. In the compressor casing 43, the casing neck 431 separates the front dovetail groove 44a from the rear dovetail groove 44b. Thus, cutting off the casing neck 431 allows the dovetail grooves 44a, 44b to be changed, as shown in FIG. 16B, to the dovetail groove 51 in which the integrated dovetail 50 for attaching stator vanes in a plurality of stages can be mounted.

Specifically, in a plurality of stator vane stages disposed consecutively with no rotor-blade cascades therebetween in the existing axial compressor, the casing can be machined so as to allow a relatively large dovetail equivalent to two or three stages of existing stator vane dovetails to be mounted by machining to bring dovetail grooves of the casing in a plurality of stages into communication with each other. This enables easy mounting of an integrated dovetail even in the existing axial compressor and thus it is easy to change the airfoil profile, axial mounting positions of airfoils, and the number of airfoils.

A cutting surface produced when the casing neck 431 is cut off may be on a level equivalent to a bottom surface in the dovetail groove 51 as shown in FIG. 16B. The cutting surface may nonetheless be cut slightly deeper than the bottom surface in the dovetail groove 51. Cut the cutting surface slightly deeper than the bottom surface in the dovetail groove 51 prevents an unwanted situation in which irregularities produced by cutting tolerances interfere with the bottom surface of the dovetail 50, thereby impeding insertion of the dovetail 50.

The foregoing has described a method of remodeling applicable when the exit guide vanes of the existing axial compressor 39 have the structure of the dovetails 42a, 42b. Preferably, however, the dovetail groove is formed in the initial design stages so as to receive the integrated dovetail 50 extending over a plurality of stages as shown in FIG. 16B.

The first embodiment has been described for an exemplary configuration of a dovetail structure that integrates cascades of two stages in the axial direction in the initial design stages. The dovetail structure may nonetheless integrate cascades of two or more stages. In this case, however, attention should be paid to the strength of the dovetail because an area of the casing that supports the dovetail is small relative to the dovetail width. Still, a change can be made in which, for example, the number of airfoil stages is changed from three to two by making the chord length per stage 1.5 times as long, so that the degree of freedom in redesigning can be further enhanced over the dovetail structure integrating two stages.

The first embodiment has been also described for an exemplary case in which the integrated dovetail 50 holds the exit guide vanes 48, 49 in the front and rear stages. The integrated dovetail 50 is nonetheless applicable to, not only the exit guide vanes, but also the last-stage stator vanes and exit guide vanes, and stator vanes in other stages, as long as the integrated dovetail 50 is applied to the stator-vane cascades 18 in a plurality of stages mounted in the casing.

Second Embodiment

A second embodiment of the present invention will be described below. A basic configuration and operating principles of an axial compressor according to the second embodiment of the present invention are the same as those of the axial compressor according to the first embodiment and detailed descriptions therefor will not be duplicated. A stator vane mounting structure for the axial compressor according to the second embodiment will be described below with reference to FIGS. 17A and 17B.

In the first embodiment, the exit guide vanes 48, 49, stator vanes in a plurality of stages, are mounted on the integrated dovetail 50 one by one, respectively. In contrast, in the second embodiment, a plurality of exit guide vanes 48, 49 are each mounted in the circumferential direction on an integrated dovetail 61, respectively. In addition, in the second embodiment, shrouds 62a, 62b that connect together the exit guide vanes 48, 49, respectively, in each stage are mounted on tip sides of the exit guide vanes 48, 49. Additionally, an inner circumferential surface 40 of the gas path has shroud grooves 65a, 65b formed therein such that inner peripheries of the shrouds 62a, 62b do not contact the inner circumferential surface 40 of the gas path.

The rotor blades 17, the IGV 21, the stator vanes 18, and the exit guide vanes 48, 49 of the gas turbine are subject to a random exciting force due to, for example, turbulence of a working gas 160. The structure, however, in which the dovetail 61 and the shroud 62 connect together both ends of the stator vanes, as embodied in the exit guide vanes 48, 49 according to the second embodiment, allows the random exciting force applied to the exit guide vanes 48, 49 to be offset through an interaction among the stator vanes connected together. This reduces vibrational stress applied to the exit guide vanes 48, 49, thereby improving reliability of the exit guide vanes 48, 49.

In addition, one possible airfoil reliability problem should be noted. Specifically, when adjacent airfoils vibrate with a specific phase difference, pressure fluctuations occurring from vibrations of the adjacent airfoils promote airfoil vibrations, causing cascade flutter in which the airfoil vibrations grow at a rapid pace to occur. With the exit guide vanes 48, 49 according to the second embodiment, however, the vibration phase difference between airfoils is fixed, which suppresses the cascade flutter, thus improving reliability of the exit guide vanes 48, 49.

In the structure according to the second embodiment, the integrated dovetail 61 has an axial width larger than that of the dovetail of the comparative example and the integrated dovetail 61 extends over a plurality of stages. This minimizes restrictions on redesigning, changing of the number of stages, and changing of the mounting positions of the exit guide vanes 48, 49, enabling relatively free designing.

Figure 18A:
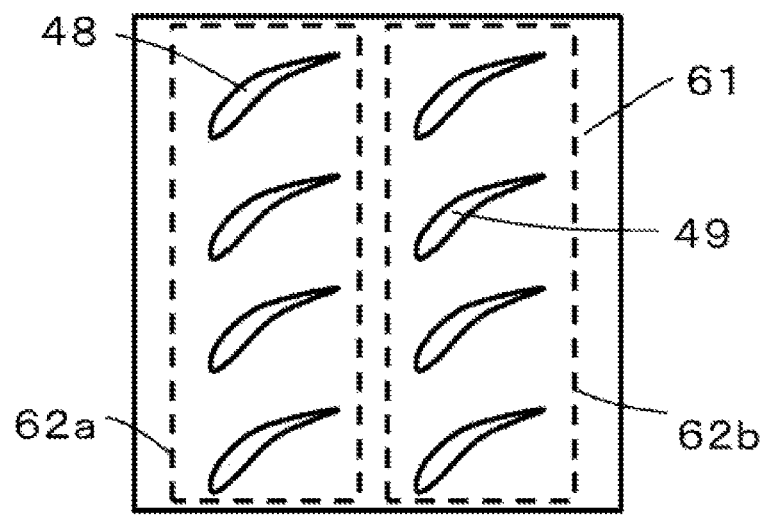
FIGS. 18A and 18B are schematic views showing the number of stator vane stages being reduced in the second embodiment.
Figure 18B:
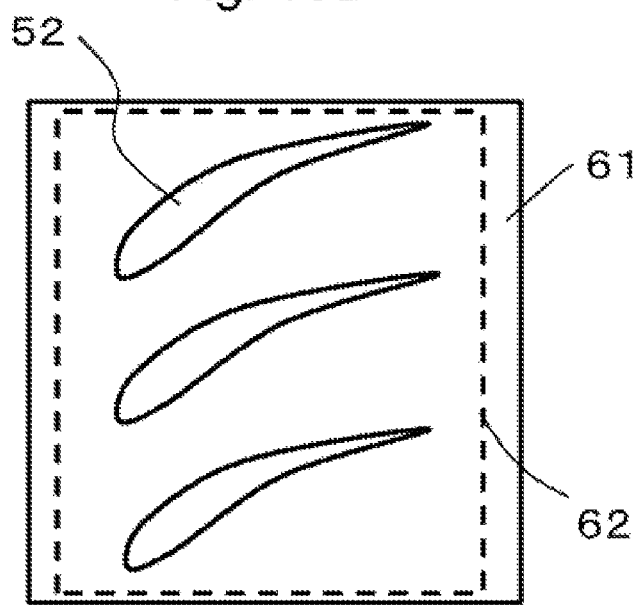

A first specific example of a method of remodeling the exit guide vanes 48, 49 in the axial compressor to which the structure according to the second embodiment is applied will be described below with reference to FIGS. 18A and 18B. FIG. 18A shows the structure before the remodeling and FIG. 18B shows the structure after the remodeling. As shown in FIGS. 18A and 18B, one method of remodeling the exit guide vanes 48, 49 is to change the exit guide vanes 48, 49 designed to be in two upstream and downstream stages to a single-stage exit guide vane 52. Specifically, the number of airfoil stages shown in FIG. 18A is changed to one and the number of airfoils per stage is changed to thereby create a structure shown in FIG. 18B. Stiffness of the airfoil can be improved by increasing a chord length and an airfoil thickness. This achieves the same effects as those achieved by the first example of remodeling the structure according to the first embodiment. Additionally, decreasing the number of airfoil stages simplifies machining processes, which can achieve an effect of cost reduction.

Changing the number of stages of the exit guide vanes 48, 49 as described above is difficult with the dovetails 42a, 42b according to the comparative example in which one dovetail is assigned to one stator vane stage. The remodeling example has been described for an exemplary case in which the number of stages of the exit guide vanes 48, 49 is changed from two to one. The use of the structure according to the second embodiment can also increase the number of stages of the exit guide vanes 48, 49 from two to three.

In the structure according to the second embodiment including the shrouds 62a, 62b that connect together tips of a plurality of the exit guide vanes 48, 49, respectively, a gap 68 exists between the shrouds 62a, 62b and the inner circumferential side of the gas path. In the gap 68, a leak flow 69 of the working gas occurs, the leak flow 69 flowing from a high-pressure side of the slipstream of the exit guide vanes 48, 49 to a low-pressure side at the front of the exit guide vanes 48, 49. This results in a problem of a reduced pressure ratio or reduced compressor adiabatic efficiency due to the mainstream being disturbed when the leak flow 69 mixes with the mainstream. In this respect, in this remodeling example, the exit guide vanes 48, 49 are replaced with the single-stage exit guide vane 52 that has an increased chord length, so that a flow path length of the gap 68 can be increased. This reduces a flow rate of the leak flow 69 to thereby reduce decrease in the pressure ratio and the compressor adiabatic efficiency.

It is further noted that the structure according to the second embodiment permits changing of the airfoil mounting position as described as the second example of remodeling the structure according to the first embodiment and changing to the tandem airfoils or the splitter airfoils as described as the third example of remodeling the structure according to the first embodiment. In this case, the remodeling of the second embodiment achieves the same effects as those achieved by the remodeling of the first embodiment.

Figure 17A:
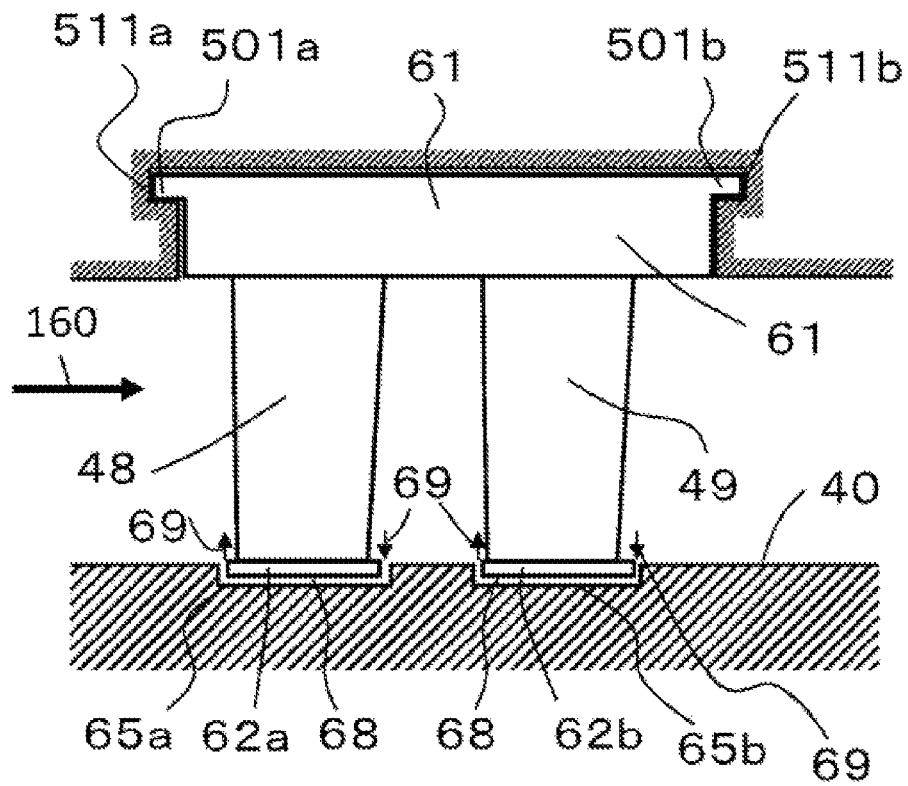
FIGS. 17A and 17B are schematic views showing a stator vane mounting structure according to a second embodiment.
Figure 17B:
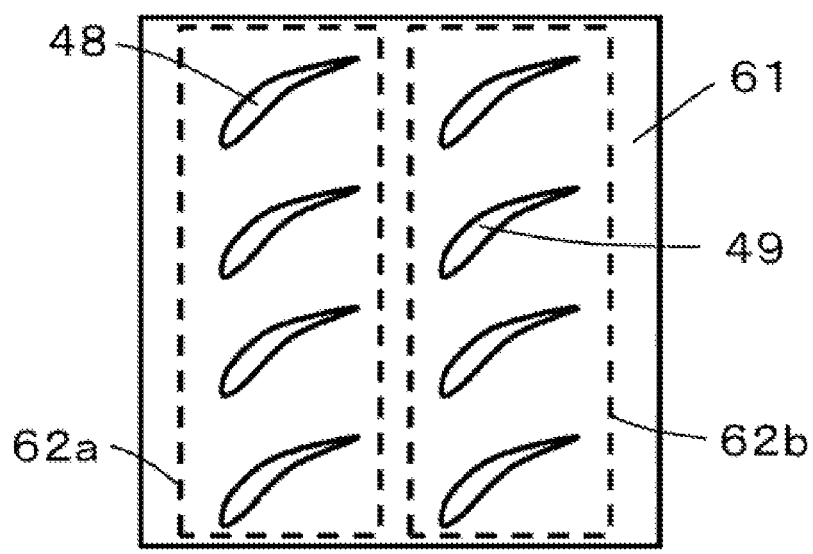
Figure 19A:
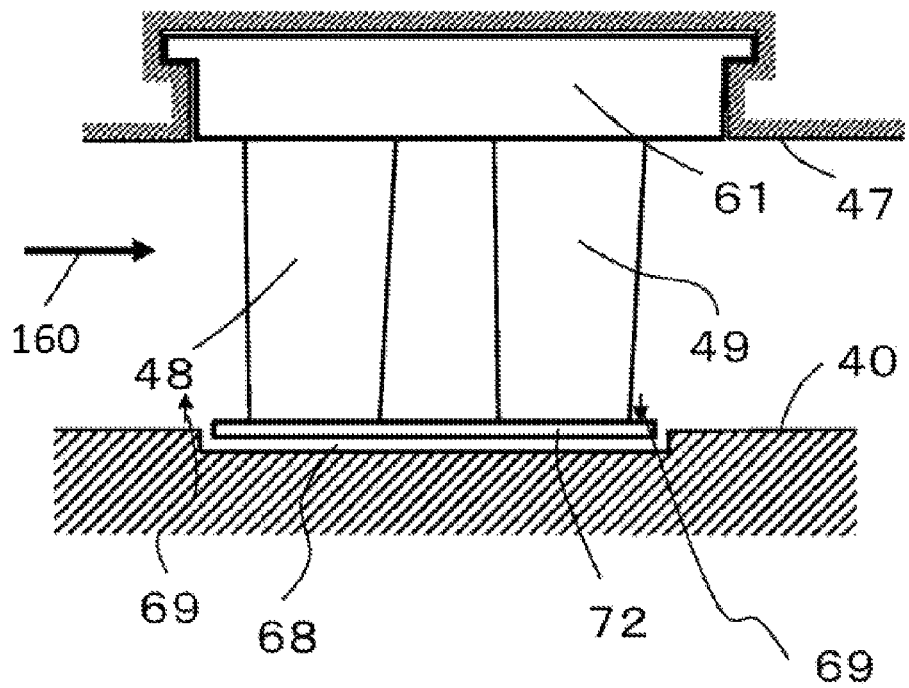
FIGS. 19A and 19B are schematic views showing a structure that includes a shroud that connects together stator vanes in a plurality of stages in the second embodiment.
Figure 19B:
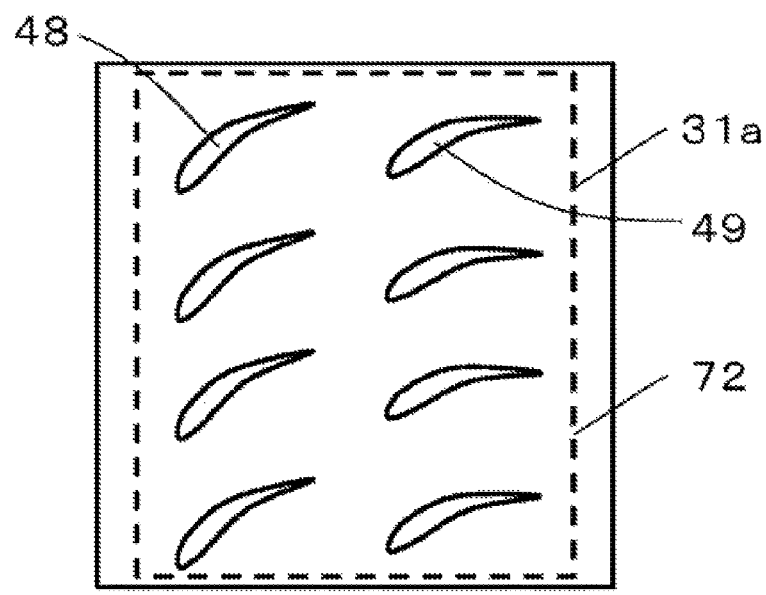

As a configuration derived from the axial compressor according to the second embodiment, the structure may include an integrated shroud 72 that connects together a plurality of exit guide vanes 48, 49 in the circumferential direction, respectively, and exit guide vanes 48, 49 in a plurality of stages in the axial direction as shown in FIGS. 19A and 19B. The integrated shroud 72 that connects together the tip sides of two or more stator vanes, the stator vanes belonging to stator-vane cascades different from each other, allows the flow path length of the gap 68 between the shroud and the inner circumferential side of the gas path to be increased, as compared with the structure that includes the shrouds 62a, 62b for respective stages of the exit guide vanes 48, 49, as shown in FIGS. 17A and 17B. This reduces the flow rate of the leak flow 69 to thereby reduce decrease in the pressure ratio and the compressor adiabatic efficiency.

Third Embodiment

Figure 20A:
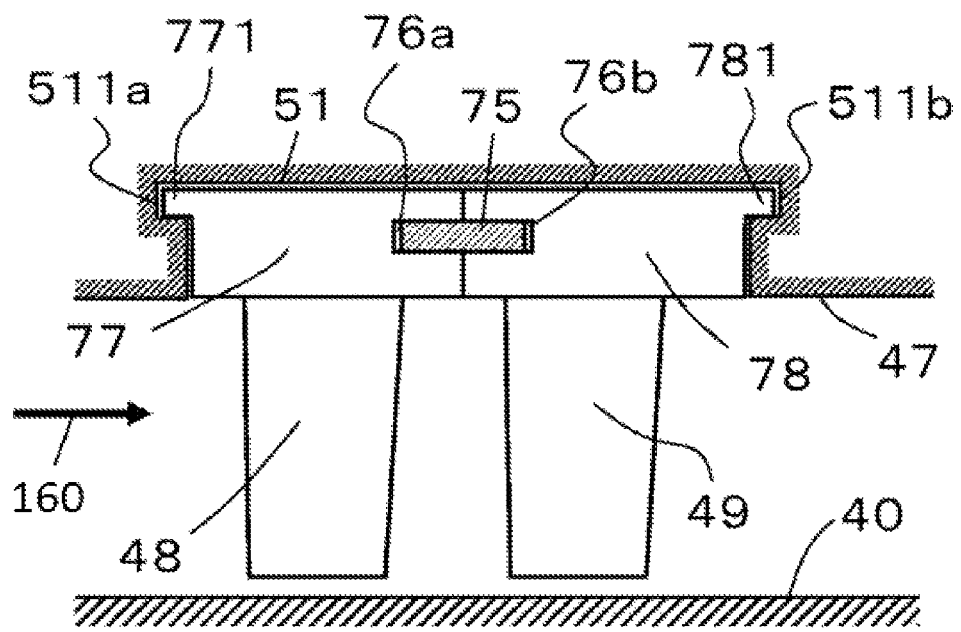
FIGS. 20A and 20B are schematic views showing a stator vane mounting structure according to a third embodiment.
Figure 20B:
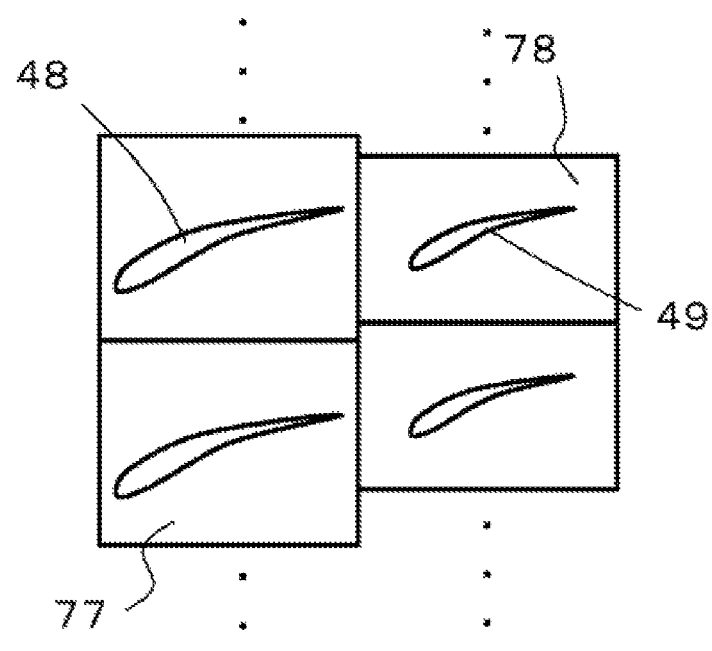

A third embodiment of the present invention will be described below with reference to FIGS. 20A and 20B. A basic configuration and operating principles of a general axial compressor according to the third embodiment of the present invention are the same as those of the axial compressor according to the first and second embodiments and detailed descriptions therefor will not be duplicated.

A dovetail groove 51 according to the third embodiment is the same as the dovetail groove 51 according to the first and second embodiments. The dovetail groove 51 according to the third embodiment has a groove width in the axial direction sufficient for the exit guide vanes 48, 49 in a plurality of stages to be fitted therein. Meanwhile, the structure according to the third embodiment includes dovetails 77, 78, each supporting individually a corresponding stage of each of the exit guide vanes 48, 49. The dovetails 77, 78 are juxtaposed in the rotational shaft direction and inserted in the single dovetail groove 51 together.

The dovetails 77, 78 juxtaposed in the rotational shaft direction have dovetail keyways 76a, 76b formed in respective side surfaces thereof facing each other. Specifically, the dovetail 77 of the front exit guide vane has the dovetail keyway 76a on the downstream side thereof in the axial direction and the dovetail 78 of the rear exit guide vane has the dovetail keyway 76b on the upstream side thereof in the axial direction. A dovetail key 75 is inserted in a rectangular space formed by the dovetail keyways 76a, 76b in the front and rear exit guide vanes facing each other, disposing in both of the dovetail keyways 76a, 76b.

As described above, in the axial compressor according to the third embodiment, the dovetails 77, 78 of the exit guide vanes 48, 49 are held by fitting of dovetail protrusions 771, 781 and recessed grooves 511a, 511b in the dovetail groove 51 and fitting of the dovetail key 75 and the dovetail keyways 76a, 76b, which enables the exit guide vanes 48, 49 to be supported without falling.

The structure according to the third embodiment allows the axial width of the dovetails 77, 78 of the exit guide vanes 48, 49 to be changed as necessary within a range of the axial width of the dovetail groove 51. Because the dovetail groove 51 is shaped similarly to those in the first and second embodiments, an even higher degree of freedom in design can be achieved using the integrated dovetail 50 when the exit guide vanes 48, 49 is to be redesigned, the number of stages is to be changed, and the mounting positions are to be changed. Furthermore, as shown in FIG. 20B, the third embodiment can achieve an axial compressor that includes front exit guide vanes 48 and rear exit guide vanes 49 having different numbers of airfoils from each other by having the different circumferential widths of the dovetails 77, 78 from each other. As such, the configuration according to the third embodiment allows the degree of freedom in the number of airfoils to be improved.

Fourth Embodiment

Figure 21A:
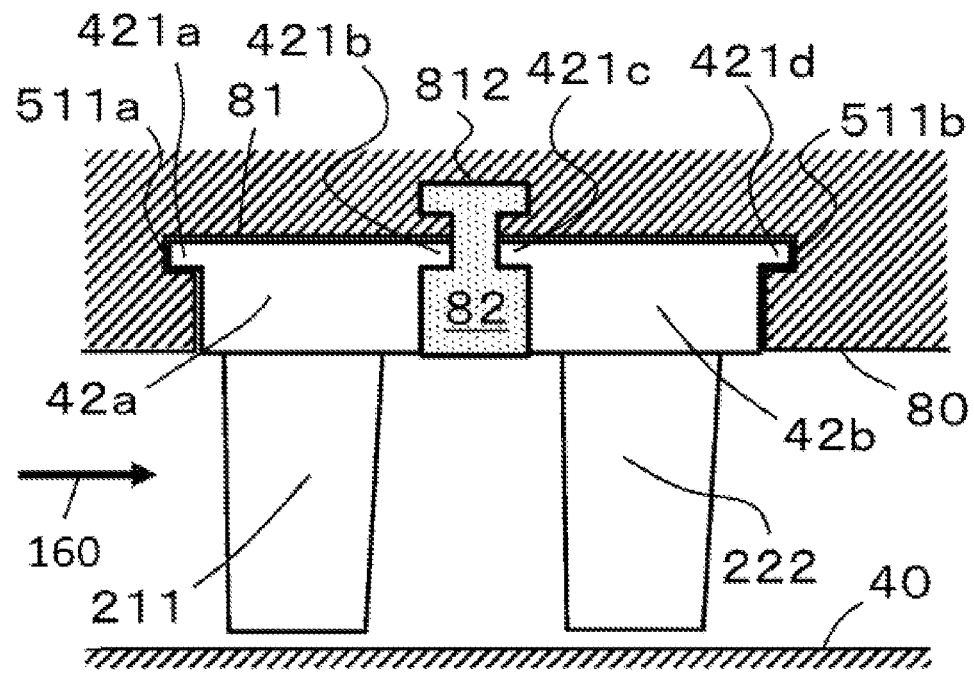
FIGS. 21A and 21B are schematic views showing a stator vane mounting structure according to a fourth embodiment.
Figure 21B:
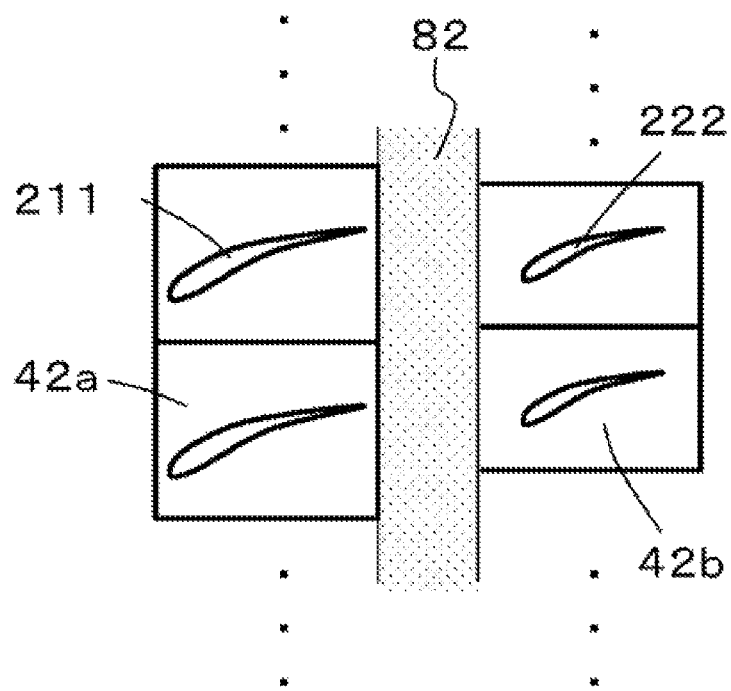

A fourth embodiment of the present invention will be described below with reference to FIGS. 21A and 21B. A basic configuration and operating principles of an axial compressor according to the fourth embodiment of the present invention are the same as those of the axial compressor according to the first through third embodiments and detailed descriptions therefor will not be duplicated.

In the fourth embodiment, the exit guide vanes 221, 222 in a plurality of stages are mounted on dovetails 42a, 42b, respectively. The dovetail 42a has protrusions 421a, 421b on side surfaces thereof and the dovetail 42b has protrusions 421c, 421d on side surfaces thereof. Specifically, the exit guide vanes and the dovetails are identical to the exit guide vanes 221, 222 and the dovetails 42a, 42b according to the comparative example shown in FIG. 9.

Meanwhile, in a bottom surface of a dovetail groove 81 according to the fourth embodiment, a spacer keyway 812 to fit a spacer key 82 in is formed into a T shape. The spacer key 82 is inserted in the spacer keyway 812. Additionally, the dovetail groove 81 has recesses 511a, 511b formed in side surfaces thereof. The protrusions 421a, 421d of the dovetails 42a, 42b are fitted into the recesses 511a, 511b. The dovetails 42a, 42b are mounted on the compressor casing 20 through a fit achieved by the protrusions 421a, 421d being inserted in the recesses 511a, 511b and by the protrusions 421b, 421c being inserted in spaces formed between the spacer key 82 and the compressor casing 20.

The spacer key 82 according to the fourth embodiment is designed such that a diameter of an inner circumference side end thereof is equivalent to a diameter of an outer circumference side of the gas path. Specifically, preferably, a difference between the inner circumference surface of the spacer key 82 and the outer circumference of the gas path, that is, an inner circumference of the casing is 0.5% or less relative to an outside diameter of the gas path. Having the diameter of the inner circumference side end of the spacer key 82 equivalent to the diameter of the outer circumference side of the gas path allows a smooth gas path to be formed using the spacer key 82.

Figure 22:
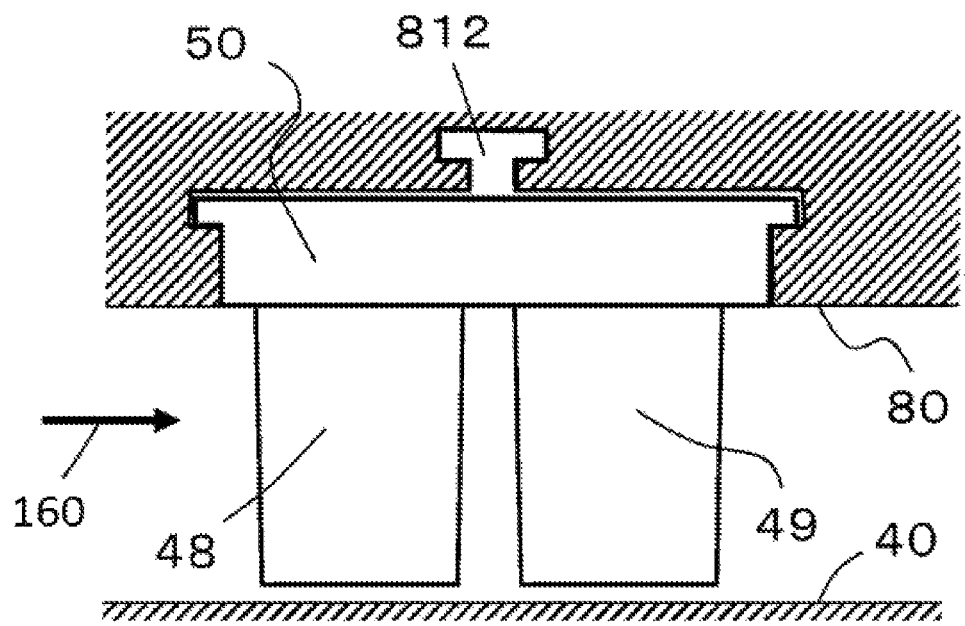
FIG. 22 is a schematic view showing an integrated dovetail applied to the stator vane mounting structure according to the fourth embodiment.

As an exemplary design change of the axial compressor having the dovetail groove 81 according to the fourth embodiment, FIG. 22 shows a structure around exit guide vanes when the exit guide vanes 221, 222 are changed to the exit guide vanes 48, 49 mounted on the integrated dovetail 50 described with reference to the first embodiment. As shown in FIG. 22, the integrated dovetail 50 can be applied even in the structure according to the fourth embodiment and the stator vanes can be easily changed including the shape of the dovetail thereof. Thus, the structure according to the fourth embodiment can ensure the degree of freedom in making changes, including redesigning the stator vanes, and changing the number of stages or the mounting positions. It is noted that the structure of the integrated dovetail 61 and the integrated shroud 72 described with reference to the second embodiment and the mounting structure incorporating the dovetails 77, 78 and the dovetail key 75 described with reference to the third embodiment may also be applicable.

Figure 23:
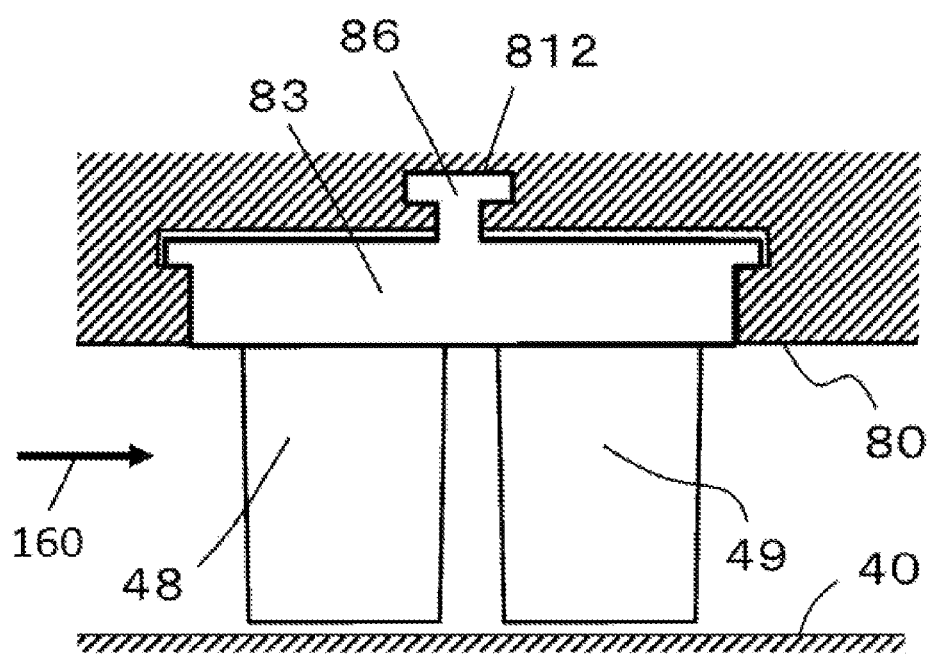
FIG. 23 is a schematic view showing another integrated dovetail applied to the stator vane mounting structure according to the fourth embodiment.

The integrated dovetail applicable to the fourth embodiment may be shaped like a dovetail 83 that has a protrusion 86 at a bottom surface thereof as shown in FIG. 23, the protrusion 86 being fittable in the spacer keyway 812. In this case, a contact area between the casing and the dovetail 83 is greater than that of the dovetail 50 shown in FIG. 22, so that improved reliability of the dovetail 83 and a compressor casing 80 can be achieved.

Figure 24:
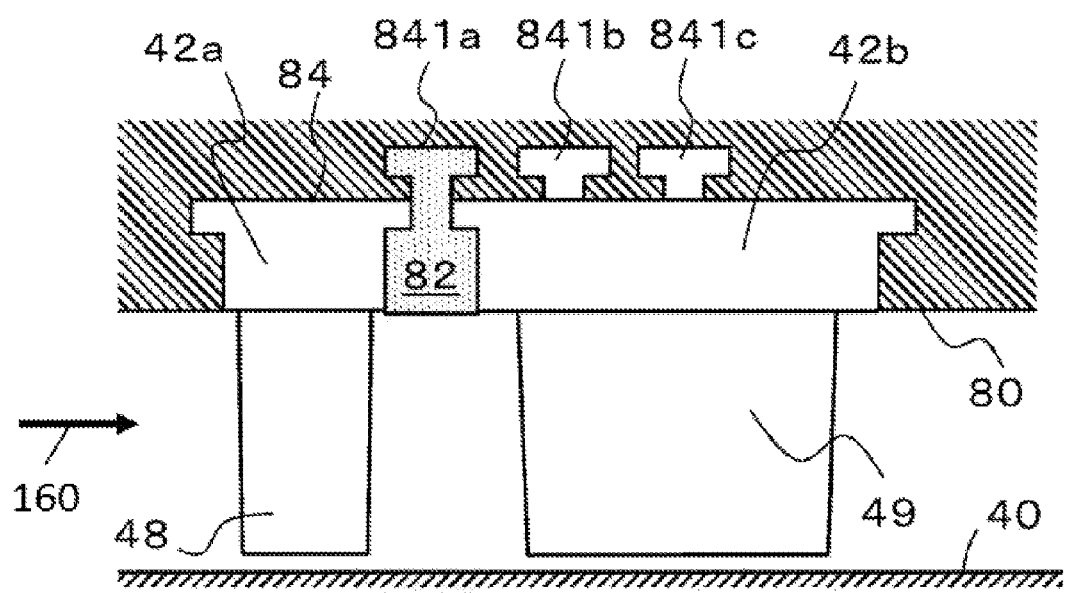
FIG. 24 is a schematic view showing a modification of the stator vane mounting structure according to the fourth embodiment.

As a configuration derived from the structure according to the fourth embodiment, the structure may have a plurality of spacer keyways 841a, 841b, 841c arranged in the axial direction in the bottom surface of a dovetail groove 84 as shown in FIG. 24. When the exit guide vanes 221, 222 are to be redesigned, or the number of stages or the mounting position is to be changed, the derivative configuration allows any of the spacer keyways 841 to be selected to fit the spacer key 82 in, enabling the axial width of the dovetail to be appropriately adjusted.

Figure 25A:
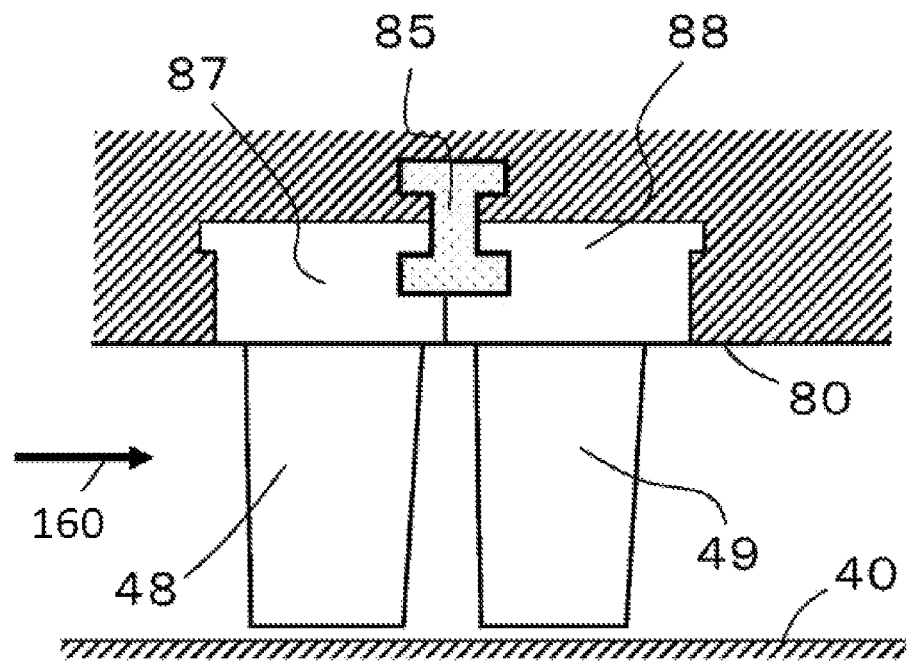
FIGS. 25A and 25B are schematic views showing another modification of the stator vane mounting structure according to the fourth embodiment.
Figure 25B:
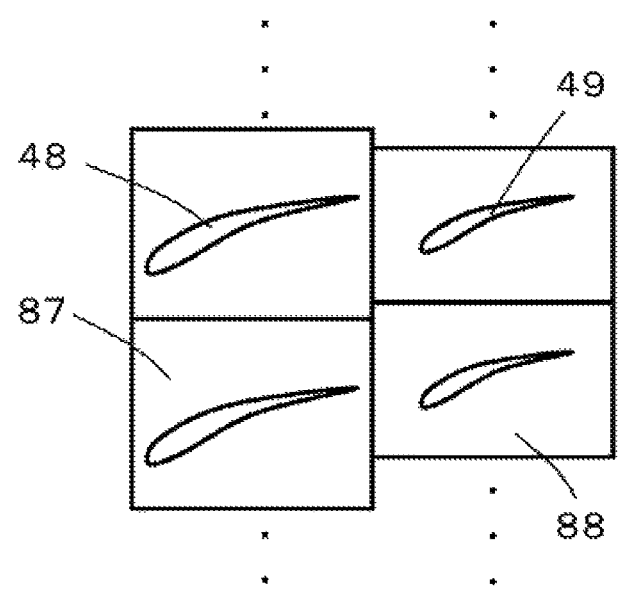

Additionally, as another configuration derived from the structure according to the fourth embodiment, the structure may include a spacer key 85 having an inner circumference side disposed radially outwardly than the gas path, so that the gas path is formed by a dovetail 87 of a front exit guide vane and a dovetail 88 of a rear exit guide vane as shown in FIGS. 25A and 25B. In this case, as compared with the exit guide vane structure shown in FIGS. 21A and 21B, the distance between the front and rear vanes can be shortened. In this respect, an even higher degree of freedom can be ensured for redesigning of airfoils and changing of the number of stages or mounting positions.

Fifth Embodiment

Figure 26:
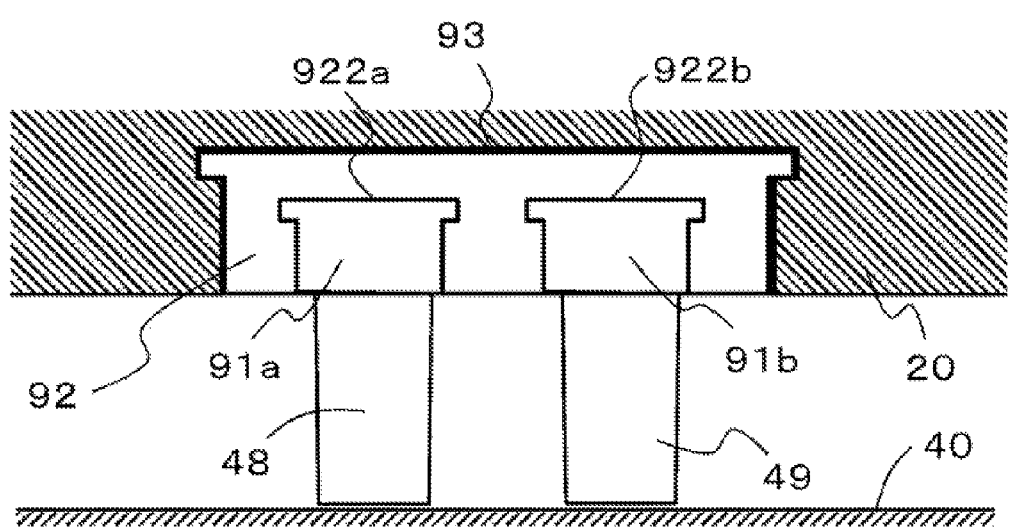
FIG. 26 is a schematic view showing a stator vane mounting structure according to a fifth embodiment.

A fifth embodiment of the present invention will be described with reference to FIG. 26. A basic configuration and operating principles of an axial compressor according to the fifth embodiment of the present invention are the same as those of the axial compressor according to the first embodiment and detailed descriptions therefor will not be duplicated.

In the fifth embodiment, the exit guide vanes 48, 49 are formed integrally with first stage dovetails 91a, 91b, respectively, and mounted on a second stage dovetail 92 by way of the first stage dovetails 91a, 91b, respectively. The second stage dovetail 92 has dovetail grooves 922a, 922b in which the first stage dovetails 91a, 91b, respectively, are to be fitted. The second stage dovetail 92 holds the exit guide vanes 48, 49 via the first stage dovetails 91a, 91b, respectively. The second stage dovetail 92 is then mounted in a dovetail groove 93 formed in the compressor casing 20.

In the fifth embodiment, the first stage dovetails 91a, 91b are inserted from the circumferential direction into the dovetail grooves 922a, 922b formed in the second stage dovetail 92; then the second stage dovetail 92 is inserted from the circumferential direction in the dovetail groove 93 formed in the compressor casing 20. The exit guide vanes 48, 49 are thereby supported in the compressor casing 20 so as not to fall. It is noted that, while the fifth embodiment has been described to include the second stage dovetail 92 that has two dovetail grooves 922a, 922b, the second stage dovetail 92 may have a single or a plurality of dovetail grooves.

In the axial compressor 39 according to the comparative example shown in FIG. 9, the axial compressor 39 including the dovetails 42a, 42b, one for each stage, fitted in the dovetail groove 44 machined directly in the compressor casing 43, the compressor casing 43 requires remodeling when the airfoil chord length is to be increased or when the number of stages or the mounting position is to be changed, thus requiring large-scale machining work. In addition, the axial compressor 39 first needs to be disassembled to demount the compressor casing 43 before the compressor casing 43 is machined. This requires that the axial compressor 39 be stopped for an extended period of time.

In contrast, in the fifth embodiment having the dovetail structure in which the first stage dovetails 91a, 91b coupled directly to the stator vanes are inserted in the dovetail grooves 922a, 922b of the second stage dovetail 92, even when the stator vane is to be redesigned, or the number of stages or the mounting position is to be changed with the aim of, for example, ensuring reliability in a possible change of operating conditions or possible installation of an additional mechanism, or with the aim of improving performance of an existing axial compressor, machining of the compressor casing 20 is not required and the second stage dovetail 92 only needs to be appropriately reshaped. This facilitates a change of the stator vane in the axial compressor.

In addition, the second stage dovetail 92, stator vanes, and the first stage dovetail for replacement may be designed and manufactured in advance before the compressor casing 20 is removed. This approach only requires that the stator vanes be mounted by inserting the manufactured second stage dovetail and first stage dovetails, after the compressor casing 20 is removed by disassembling the axial compressor. As compared with a similar exit guide vane redesigning process performed on the axial compressor 39 according to the comparative example, downtime can be shortened.

The fifth embodiment has been described for exemplary stator vanes having no shroud at their tips. The structure may nonetheless include a shroud disposed at the tip sides of the stator vanes so as to connect together a plurality of stator vanes in the circumferential direction in each stage or in a plurality of stages. In this case, reliability of airfoils can be improved in terms of a random exciting force and cascade flutter, as in the second embodiment.

The fifth embodiment has been described for a case in which the exit guide vanes in two stages are mounted on the second stage dovetail. The dovetail incorporating the similar dual-layer structure may still be applied to the stator vane in last stage and other stator vanes.

As described heretofore, through the configuration of each of the first through fifth embodiments, each having the dovetail groove in which two or more stator vanes, the stator vanes belonging to stator-vane cascades different from each other, are mounted, the stator vanes can be mounted in the compressor casing using various structures including the integrated dovetails 50, 61 described with reference to the first and second embodiments, the dovetail key 75 described with reference to the third embodiment, the spacer key 82 described with reference to the fourth embodiment, and the second stage dovetail 92 described with reference to the fifth embodiment and one structure can be easily replaced with another. Thus, each of the structures according to the first through fifth embodiments of the present invention can provide an axial compressor capable of suppressing restrictions, which arises from the dovetail structure, on the degree of freedom in changing airfoils and having relatively low restrictions when a stator vane profile, a vane mounting position, or the number of vane stages is to be changed.

What is claimed is:

1. An axial compressor comprising:
a rotor as a rotational shaft;
a plurality of rotor blades mounted on the rotor;
a compressor casing that covers the rotor and the rotor blades; and
a plurality of stator vanes mounted on the compressor casing, the rotor blades and the stator vanes being each disposed in a circumferential direction of the rotational shaft to form a rotor-blade cascade and a stator-vane cascade, respectively; the rotor-blade cascade and the stator-vane cascade being arranged in plural rows, respectively, in an axial direction of the rotational shaft; wherein
the stator vane has a dovetail as a base for supporting a vane section,
the compressor casing has at least one dovetail groove extending in the circumferential direction of the rotational shaft, the dovetail groove receiving the dovetail inserted therein to fix the stator vane,
two or more stator vanes, the stator vanes belonging to stator-vane cascades different from each other, are fixed in the one dovetail groove,
the dovetails are disposed in the one dovetail groove in the axial direction of the rotational shaft, and
the dovetails juxtaposed in the axial direction of the rotational shaft have dovetail keyways formed in respective side surfaces thereof, the side surfaces facing each other, such that the dovetail keyways facing each other, and a dovetail key extending over the two dovetail keyways is inserted in the two dovetail keyways.

2. An axial compressor comprising:
a rotor as a rotational shaft;
a plurality of rotor blades mounted on the rotor;
a compressor casing that covers the rotor and the rotor blades; and
a plurality of stator vanes mounted on the compressor casing, the rotor blades and the stator vanes being each disposed in a circumferential direction of the rotational shaft to form a rotor-blade cascade and a stator-vane cascade, respectively; the rotor-blade cascade and the stator-vane cascade being arranged in plural rows, respectively, in an axial direction of the rotational shaft; wherein
the stator vane has a dovetail as a base for supporting a vane section, the compressor casing has at least one dovetail groove extending in the circumferential direction of the rotational shaft, the dovetail groove receiving the dovetail inserted therein to fix the stator vane, two or more stator vanes, the stator vanes belonging to stator-vane cascades different from each other, are fixed in the one dovetail groove, a spacer key supported by the compressor casing by being fitted in a spacer keyway formed in a bottom surface of the one dovetail groove, wherein the dovetails are disposed in the one dovetail groove in the axial direction of the rotational shaft and are mounted in the compressor casing by fitting of a space formed between the spacer key and the compressor casing and protrusions formed on the dovetails.

3. The axial compressor according to claim 2, wherein, relative to a diametrical direction of the rotational shaft, a diameter of an inner circumferential side end of the spacer key is equivalent to that of an outer circumferential side of a gas path as a flow path of a working medium in the axial compressor.

4. The axial compressor according to claim 2, wherein, relative to a diametrical direction of the rotational shaft, a diameter of an inner circumferential side end of the spacer key is greater than that of an outer circumferential side of a gas path as a flow path of a working medium in the axial compressor, and the dovetails disposed in the one dovetail groove extend over a space defined between the inner circumferential side end of the spacer key and the outer circumference of the gas path in the axial compressor.

5. The axial compressor according to claim 2, wherein the one dovetail groove has a plurality of spacer keyways formed in the bottom surface thereof in the axial direction of the rotational shaft, each of the spacer keyways receiving the spacer key fitted therein.

6. A gas turbine comprising:
the axial compressor according to claim 1;
a combustor that mixes compressed air compressed by the axial compressor with fuel and burns a resultant mixture; and
a turbine driven by a combustion gas generated by the combustor.

7. A method of remodeling the axial compressor according to claim 5, comprising:
replacing the two or more stator vanes, the stator vanes belonging to stator-vane cascades different from each other and disposed in the one dovetail groove, with at least one stator vane having a chord length and an airfoil thickness increased.

8. A method of remodeling the axial compressor according to claim 1, comprising:
using a dovetail that integrally supports a plurality of stator vanes, changing the two or more stator vanes, the stator vanes belonging to stator-vane cascades different from each other and disposed in the one dovetail groove, to a tandem airfoil in which the stator vanes are disposed close to each other back and forth in the axial direction of the rotational shaft or to a splitter airfoil comprising an upstream stator vane and a stator vane disposed close thereto, the stator vane having a relatively short chord length as compared with the upstream stator vane.

9. A method of remodeling the axial compressor according to claim 1, comprising:
changing the dovetails disposed in the one dovetail groove to a dovetail that integrally supports two or more stator vanes, the stator vanes belonging to stator-vane cascades different from each other.

10. A method of remodeling an axial compressor, the axial compressor comprising:
a rotor as a rotational shaft;
a plurality of rotor blades mounted on the rotor;
a compressor casing that covers the rotor and the rotor blades;
a plurality of stator vanes mounted on the compressor casing; and
a plurality of dovetails as bases for supporting the stator vanes, the compressor casing having a plurality of dovetail grooves extending in a circumferential direction of the rotational shaft, the dovetail grooves receiving the dovetails inserted therein to fix the stator vanes, the rotor blades and the stator vanes being each disposed in the circumferential direction of the rotational shaft to form a rotor-blade cascade and a stator-vane cascade, respectively; the rotor-blade cascade and the stator-vane cascade being arranged in plural rows, respectively, in an axial direction of the rotational shaft,
the method comprising:
machining the compressor casing by cutting a bulkhead that separates the dovetail grooves juxtaposed back and forth in the axial direction of the rotational shaft to thereby provide communication between the dovetail grooves.

11. A gas turbine comprising:
the axial compressor according to claim 2;
a combustor that mixes compressed air compressed by the axial compressor with fuel and burns a resultant mixture; and
a turbine driven by a combustion gas generated by the combustor.

12. A method of remodeling the axial compressor according to claim 2, comprising:
replacing the two or more stator vanes, the stator vanes belonging to stator-vane cascades different from each other and disposed in the one dovetail groove, with at least one stator vane having a chord length and an airfoil thickness increased.

13. A method of remodeling the axial compressor according to claim 2, comprising:
using a dovetail that integrally supports a plurality of stator vanes, changing the two or more stator vanes, the stator vanes belonging to stator-vane cascades different from each other and disposed in the one dovetail groove, to a tandem airfoil in which the stator vanes are disposed close to each other back and forth in the axial direction of the rotational shaft or to a splitter airfoil comprising an upstream stator vane and a stator vane disposed close thereto, the stator vane having a relatively short chord length as compared with the upstream stator vane.

14. A method of remodeling the axial compressor according to claim 2, comprising:
changing the dovetails disposed in the one dovetail groove to a dovetail that integrally supports two or more stator vanes, the stator vanes belonging to stator-vane cascades different from each other.

* * * * *